(12) United States Patent
Sugio et al.

(10) Patent No.: US 10,880,545 B2
(45) Date of Patent: Dec. 29, 2020

(54) IMAGE CODING METHOD, IMAGE DECODING METHOD, IMAGE CODING APPARATUS, IMAGE DECODING APPARATUS, AND IMAGE CODING AND DECODING APPARATUS

(71) Applicant: Sun Patent Trust, New York, NY (US)

(72) Inventors: Toshiyasu Sugio, Osaka (JP); Takahiro Nishi, Nara (JP); Youji Shibahara, Tokyo (JP); Hisao Sasai, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 16/743,042

(22) Filed: Jan. 15, 2020

(65) Prior Publication Data

US 2020/0154102 A1 May 14, 2020

Related U.S. Application Data

(63) Continuation of application No. 16/232,305, filed on Dec. 26, 2018, now Pat. No. 10,574,983, which is a
(Continued)

(51) Int. Cl.
*H04N 19/107* (2014.01)
*H04N 19/124* (2014.01)
(Continued)

(52) U.S. Cl.
CPC ......... *H04N 19/107* (2014.11); *H04N 19/105* (2014.11); *H04N 19/124* (2014.11);
(Continued)

(58) Field of Classification Search
None
See application file for complete search history.

(56) References Cited

U.S. PATENT DOCUMENTS 7,944,975 B2   5/2011  Cha
9,264,726 B2   2/2016  Sugio
(Continued)

FOREIGN PATENT DOCUMENTS

CN   1507751   6/2004
CN   1943244   4/2007
(Continued)

OTHER PUBLICATIONS

International Search Report dated Apr. 17, 2012 in International (PCT) Application No. PCT/JP2011/007309.
(Continued)

*Primary Examiner* — Frederick D Bailey
(74) *Attorney, Agent, or Firm* — Wenderoth, Lind & Ponack, L.L.P.

(57) ABSTRACT

An image coding method includes: adding, to a candidate list, a first adjacent motion vector as a candidate for a predicted motion vector to be used for coding the current motion vector; selecting the predicted motion vector from the candidate list; and coding the current motion vector, wherein in the adding, the first adjacent motion vector indicating a position in a first reference picture included in a first reference picture list is added to the candidate list for the current motion vector indicating a position in a second reference picture included in a second reference picture list.

2 Claims, 31 Drawing Sheets

Related U.S. Application Data continuation of application No. 15/978,697, filed on May 14, 2018, now Pat. No. 10,638,128, which is a continuation of application No. 15/611,002, filed on Jun. 1, 2017, now Pat. No. 9,998,736, which is a continuation of application No. 15/235,337, filed on Aug. 12, 2016, now Pat. No. 9,729,877, which is a continuation of application No. 14/976,238, filed on Dec. 21, 2015, now Pat. No. 9,445,105, which is a continuation of application No. 14/695,246, filed on Apr. 24, 2015, now Pat. No. 9,264,726, which is a continuation of application No. 13/336,353, filed on Dec. 23, 2011, now Pat. No. 9,049,455.

(60) Provisional application No. 61/427,587, filed on Dec. 28, 2010.

(51) Int. Cl.

| | | |
|---|---|---|
| *H04N 19/52* | (2014.01) | |
| *H04N 19/139* | (2014.01) | |
| *H04N 19/577* | (2014.01) | |
| *H04N 19/58* | (2014.01) | |
| *H04N 19/573* | (2014.01) | |
| *H04N 19/567* | (2014.01) | |
| *H04N 19/137* | (2014.01) | |
| *H04N 19/61* | (2014.01) | |
| *H04N 19/46* | (2014.01) | |
| *H04N 19/172* | (2014.01) | |
| *H04N 19/176* | (2014.01) | |
| *H04N 19/105* | (2014.01) | |
| *H04N 19/56* | (2014.01) | |
| *H04N 19/70* | (2014.01) | |
| *H04N 19/51* | (2014.01) | |

(52) U.S. Cl.
CPC ......... *H04N 19/137* (2014.11); *H04N 19/139* (2014.11); *H04N 19/172* (2014.11); *H04N 19/176* (2014.11); *H04N 19/46* (2014.11); *H04N 19/52* (2014.11); *H04N 19/56* (2014.11); *H04N 19/567* (2014.11); *H04N 19/573* (2014.11); *H04N 19/577* (2014.11); *H04N 19/58* (2014.11); *H04N 19/61* (2014.11); *H04N 19/51* (2014.11); *H04N 19/70* (2014.11)

(56) References Cited

U.S. PATENT DOCUMENTS

| | | |
|---|---|---|
| 2004/0008784 A1 | 1/2004 | Kikuchi et al. |
| 2004/0013308 A1 | 1/2004 | Jeon et al. |
| 2004/0057520 A1 | 3/2004 | Sun |
| 2004/0057523 A1 | 3/2004 | Koto et al. |
| 2004/0136461 A1 | 7/2004 | Kondo et al. |
| 2004/0146109 A1 | 7/2004 | Kondo et al. |
| 2005/0117646 A1 | 6/2005 | Joch et al. |
| 2005/0232359 A1 | 10/2005 | Cha |
| 2006/0262981 A1 | 11/2006 | Jeon et al. |
| 2007/0014366 A1 | 1/2007 | Koto et al. |
| 2007/0019727 A1 | 1/2007 | Koto et al. |
| 2007/0019728 A1 | 1/2007 | Koto et al. |
| 2007/0019735 A1 | 1/2007 | Koto et al. |
| 2007/0019736 A1 | 1/2007 | Koto et al. |
| 2007/0019737 A1 | 1/2007 | Koto et al. |
| 2007/0030907 A1 | 2/2007 | Koto et al. |
| 2007/0030908 A1 | 2/2007 | Koto et al. |
| 2007/0030909 A1 | 2/2007 | Koto et al. |
| 2007/0030910 A1 | 2/2007 | Koto et al. |
| 2007/0036216 A1 | 2/2007 | Koto et al. |
| 2007/0036220 A1 | 2/2007 | Koto et al. |
| 2007/0036221 A1 | 2/2007 | Koto et al. |
| 2007/0086526 A1 | 4/2007 | Koto et al. |
| 2007/0127571 A1 | 6/2007 | Makino |
| 2007/0211802 A1 | 9/2007 | Kikuchi et al. |
| 2008/0069235 A1 | 3/2008 | Abe |
| 2008/0279280 A1 | 11/2008 | Iguchi et al. |
| 2009/0034612 A1 | 2/2009 | Joch et al. |
| 2009/0034621 A1 | 2/2009 | Joch et al. |
| 2010/0166073 A1 | 7/2010 | Schmit et al. |
| 2011/0170605 A1 | 7/2011 | Sato et al. |
| 2011/0176610 A1 | 7/2011 | He et al. |
| 2012/0008688 A1 | 1/2012 | Tsai et al. |
| 2012/0008690 A1 | 1/2012 | Lee et al. |
| 2012/0027089 A1 | 2/2012 | Chien et al. |
| 2012/0128060 A1 | 5/2012 | Lin et al. |
| 2012/0163466 A1 | 6/2012 | Sugio et al. |
| 2013/0128983 A1 | 5/2013 | Sugio et al. |
| 2015/0229958 A1 | 8/2015 | Lim |

FOREIGN PATENT DOCUMENTS

| | | |
|---|---|---|
| EP | 1 377 067 | 1/2004 |
| JP | 2004-23458 | 1/2004 |
| JP | 2004-056756 | 2/2004 |
| JP | 2007-116355 | 5/2007 |
| JP | 2007-325119 | 12/2007 |
| JP | 2008-278423 | 11/2008 |
| WO | 2010/035730 | 4/2010 |
| WO | 2011/041321 | 4/2011 |
| WO | 2012/006889 | 1/2012 |

OTHER PUBLICATIONS

Jian-Liang Lin et al., "Improved Advanced Motion Picture Vector Prediction", Joint Collaborative Team on Video Coding (JCT-VC) of ITU-T SG16 WP3 and ISO/IEC JTC1/SC29/WG11, JCTVC-D125, 4th Meeting: Daegu, KR, Jan. 20-28, 2011.

"Test Mode under Consideration" Output Document (draft007), Joint Collaborative Team on Video Coding (JCT-VC) of ITU-T SG16 WP3 and ISO/IEC JTC1/SC29/WG11 2$^{nd}$ Meeting; Geneva, CH, Document: JCTVC-B205, ITU-T, Oct. 2010, p. 1, 28, 35-38, 54 and 61-66.

Extended European Search Report dated Sep. 25, 2014 in European Application No. 11854143.2.

Office Action dated Jul. 17, 2014 in U.S. Appl. No. 13/814,060.

Search and Examination Report dated Nov. 5, 2014 in Singapore Application No. 201300557-4.

ITU-T H.264, Telecommunication Standardization Sector of ITU, Series H: Audiovisual and Multimedia Systems Infrastructure of audiovisual services—Coding of moving video, "Advanced video coding for generic audiovisual services", Mar. 2010, pp. 9, 89, 111-129, and 150-174.

International Search Report dated Apr. 17, 2012 in International (PCT) Application No. PCT/JP2011/007319.

Office Action dated Nov. 3, 2016 in U.S. Appl. No. 15/235,337.

Extended European Search Report dated Jun. 30, 2017 in European Patent Application No. 17157139.1.

Examination Report No. 1 dated Jun. 9, 2017 for Australian Patent Application No. 2016202666.

Toshiyasu Sugio et al., "Modified derivation process of temporal motion vector Video Coding (JCT-VC) of ITU-T SG16 WP3 and ISO/IEC JTC1/SC29/WG11, JCTVC-D273, pp. 1-4 predictor", Joint Collaborative Team on 4th Meeting: Daegu, KR, Jan. 2011, JCTVC-D273, pp. 1-4.

Office Action dated Jul. 11, 2017 in U.S. Appl. No. 15/611,002.

Office Action dated Jun. 28, 2018 in Indian Application No. 731/CHENP/2013, with English translation.

Office Action dated Jul. 18, 2019 in U.S. Appl. No. 15/978,697.

Notice of Allowance dated Oct. 15, 2019 in U.S. Appl. No. 16/232,305.

FIG. 6B

Candidate list for second prediction direction

| Predicted motion vector index | Candidate predicted motion vector |
|---|---|
| 0 | Median (MvL1_A, MvL0_B, MvL1_C) |
| 1 | MvL1_A |
| 2 | MvL0_B |
| 3 | MvL1_C |

FIG. 7

| Predicted motion vector index | Allocated bitstream |
|---|---|
| 0 | 0 |
| 1 | 10 |
| 2 | 110 |
| 3 | 1110 |
| 4 | 11110 |

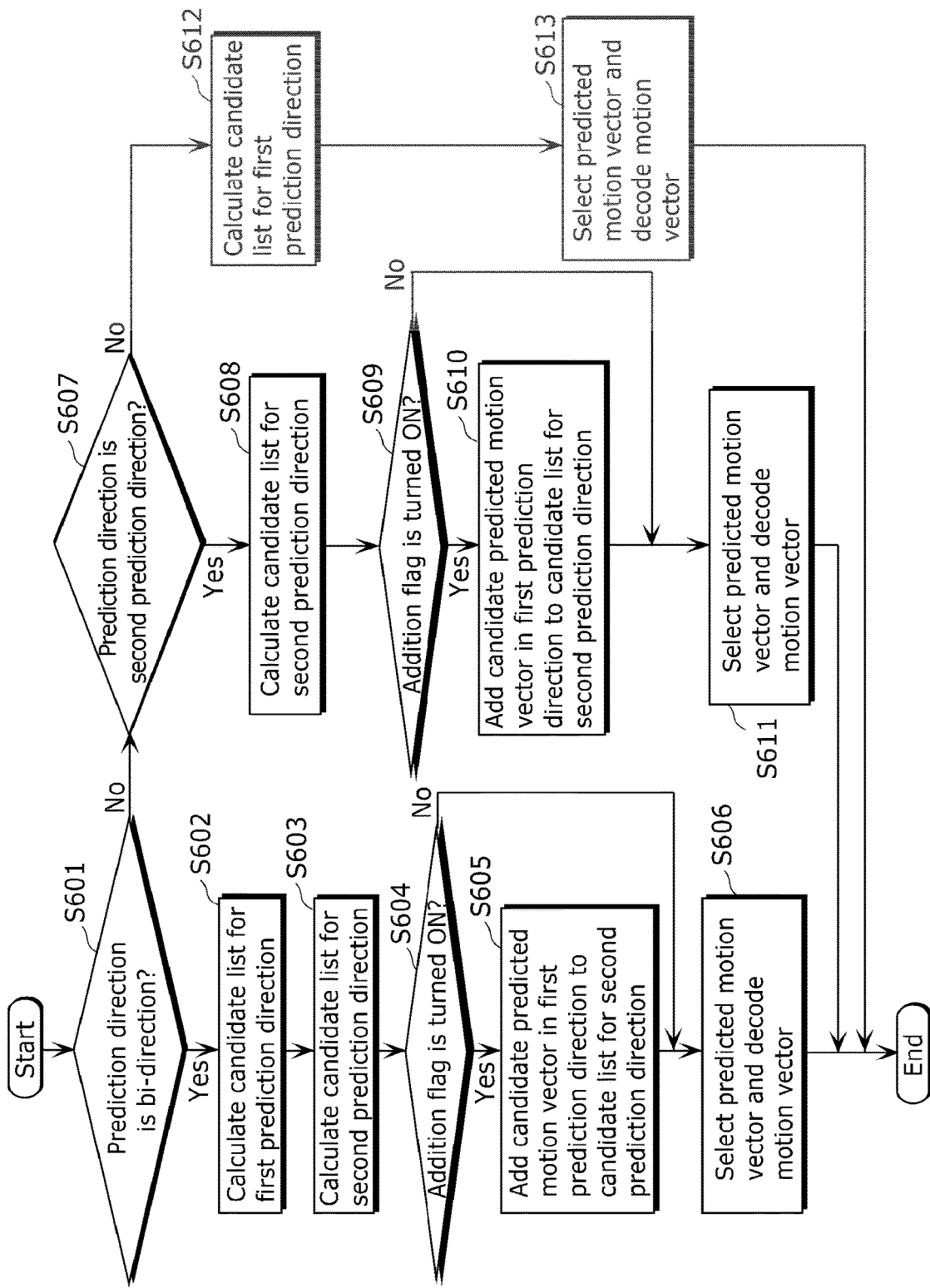

FIG. 20

| Video stream (PID=0x1011, Primary video) |
|---|
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

Stream of TS packets

Data structure of PMT

| Corresponding standard | Driving frequency |
|---|---|
| MPEG-4 AVC | 500 MHz |
| MPEG-2 | 350 MHz |
| ⋮ | ⋮ | ex900

IMAGE CODING METHOD, IMAGE DECODING METHOD, IMAGE CODING APPARATUS, IMAGE DECODING APPARATUS, AND IMAGE CODING AND DECODING APPARATUS

BACKGROUND OF THE INVENTION

(1) Field of the Invention

The present invention relates to an image coding method of coding an image with prediction, and an image decoding method of decoding an image with prediction.

(2) Description of the Related Art

An image coding apparatus generally compresses an information amount using redundancy of images (including still images and moving images) in spatial and temporal directions. Here, transformation into a frequency domain is used as the compression method using redundancy in the spatial direction. Furthermore, inter prediction is used as the compression method using redundancy in the temporal direction. The inter prediction is also called inter-picture prediction.

When coding a certain picture, the image coding apparatus that employs the inter prediction uses, as a reference picture, a coded picture located before or after the current picture to be coded in display order. Subsequently, the image coding apparatus estimates a motion vector of the current picture with respect to the reference picture.

Next, the image coding apparatus obtains predicted image data resulting from motion compensation based on the motion vector. Then, the image coding apparatus obtains a difference between image data of the current picture and the predicted image data. Then, the image coding apparatus codes the obtained difference. Accordingly, the image coding apparatus removes the redundancy in the temporal direction.

The image coding apparatus in accordance with the moving picture coding scheme called H.264 (see Non-patent reference "ITU-T H.264 03/2010") which has already been standardized uses three types of pictures, that is, I-picture, P-picture, and B-picture to compress the information amount. The image coding apparatus does not perform inter prediction on the I-picture. In other words, the image coding apparatus performs intra prediction on the I-picture. The intra prediction is also called intra-picture prediction.

Furthermore, the image coding apparatus performs inter prediction on the P-picture with reference to one coded picture located before or after the current picture in display order. Furthermore, the image coding apparatus performs inter prediction on the B-picture with reference to two coded pictures located before or after the current picture in display order.

In the inter prediction, the image coding apparatus generates a reference list (also called a reference picture list) for identifying a reference picture. In the reference list, reference picture indexes are allocated to coded reference pictures to be referred to in the inter prediction. For example, the image coding apparatus holds two reference lists (L0, L1) to refer to two pictures for the B-picture.

FIG. 33 illustrates an example of reference lists. The first reference picture list (L0) of FIG. 33 is an example of a reference picture list corresponding to a first prediction direction for the bi-directional prediction. In the first reference picture list of FIG. 33, a reference picture index indicated by 0 is allocated to a reference picture R1 in a display order 2. Furthermore, a reference picture index indicated by 1 is allocated to a reference picture R2 in a display order 1. Furthermore, a reference picture index indicated by 2 is allocated to a reference picture R3 in a display order 0.

In other words, in the first reference picture list of FIG. 33, a smaller reference picture index is allocated to a reference picture as the reference picture is closer to the current picture in display order.

On the other hand, the second reference picture list (L1) of FIG. 33 is an example of a reference picture list corresponding to a second prediction direction for the bi-directional prediction. In the second reference picture list of FIG. 33, a reference picture index indicated by 0 is allocated to the reference picture R2 in the display order 1. Furthermore, a reference picture index indicated by 1 is allocated to the reference picture R1 in the display order 2. Furthermore, a reference picture index indicated by 2 is allocated to the reference picture R3 in the display order 0.

As such, there are cases where two different reference picture indexes are allocated to a particular reference picture (reference picture R1 or R2 in FIG. 33) included in the two reference picture lists. Furthermore, there are cases where the same reference picture index is allocated to a particular reference picture (reference picture R3 in FIG. 33) included in the two reference picture lists.

The prediction using only the first reference picture list (L0) is called the L0 prediction. The prediction using only the second reference picture list (L1) is called the L1 prediction. The prediction using both of the first reference picture list and the second reference picture list is called the bi-directional prediction or bi-prediction.

In the L0 prediction, a forward direction is frequently used as a prediction direction. In the L1 prediction, a backward direction is frequently used as a prediction direction. In other words, the first reference picture list corresponds to the first prediction direction, and the second reference picture list corresponds to the second prediction direction.

Based on these relationships, the prediction direction is categorized into one of the first prediction direction, the second prediction direction, and the bi-direction. Furthermore, when the prediction direction is the bi-direction, it may be also represented as the bi-directional prediction or bi-prediction.

The H.264 image coding scheme has a motion vector estimation mode as a coding mode for the block to be coded in the B-picture. In the motion vector estimation mode, the image coding apparatus estimates a motion vector for a block to be coded with reference to a reference picture. The image coding apparatus generates predicted image data using the reference picture and the motion vector. Then, image coding apparatus codes (i) a difference between the predicted image data and image data of the block to be coded and (ii) the motion vector to be used for generating the predicted image data.

The motion vector estimation mode may use the bi-directional prediction for generating a predicted image with reference to two coded pictures located before or after the current picture. Furthermore, the motion vector estimation mode may use the one-directional prediction for generating a predicted image with reference to one coded picture located before or after the current picture. Then, one of the bi-directional prediction and one-directional prediction is selected for a block to be coded.

When coding a motion vector in the motion vector estimation mode, the image coding apparatus generates a predicted motion vector from a motion vector of a block, such as an adjacent coded block to the current block. The image coding apparatus codes a difference between the motion vector and the predicted motion vector. Accordingly, the image coding apparatus reduces the information amount. The specific example will be described with reference to FIG. 34.

FIG. 34 illustrates a current block to be coded, an adjacent block A, an adjacent block B, and an adjacent block C. The adjacent block A is an adjacent coded block to the left of the current block. The adjacent block B is an adjacent coded block above the current block. The adjacent block C is an adjacent coded block to the upper right of the current block.

In FIG. 34, the adjacent block A has been coded with the bi-directional prediction, and has a motion vector MvL0_A in the first prediction direction, and a motion vector MvL1_A in the second prediction direction. Here, the motion vector in the first prediction direction is a motion vector indicating a position in a reference picture identified by the first reference picture list. The motion vector in the second prediction direction is a motion vector indicating a position in a reference picture identified by the second reference picture list.

Furthermore, the adjacent block B has been coded with the one-directional prediction, and has a motion vector MvL0_B in the first prediction direction. Furthermore, the adjacent block C has been coded with the bi-directional prediction, and has a motion vector MvL0_C in the first prediction direction, and a motion vector MvL1_C in the second prediction direction. Furthermore, the current block is a block to be coded with the bi-directional prediction, and has a motion vector MvL0 in the first prediction direction, and a motion vector MvL1 in the second prediction direction.

The image coding apparatus generates a predicted motion vector PMvL0 corresponding to the first prediction direction, using an adjacent block having a motion vector in the first prediction direction, when coding the motion vector MvL0 in the first prediction direction of the current block. More specifically, the image coding apparatus generates the predicted motion vector PMvL0 using the motion vector MvL0_A of the adjacent block A, the motion vector MvL0_B of the adjacent block B, and the motion vector MvL0_C of the adjacent block C.

In other words, the image coding apparatus uses a motion vector in the first prediction direction of an adjacent block to the current block, when coding the motion vector MvL0 in the first prediction direction of the current block. Then, the image coding apparatus codes a difference between the motion vector MvL0 and the predicted motion vector PMvL0.

The predicted motion vector PMvL0 is calculated using Median (MvL0_A, MvL0_B, and MvL0_C) that is an equation for calculating a median value (central value) of the motion vectors MvL0_A, MvL0_B, and MvL0_C. Median is represented by the following Equations 1 to

[Math 1]

$$\text{Median}(x, y, z) = \quad \text{(Equation 1)}$$
$$x + y + z - \text{Min}(x, \text{Min}(y, z)) - \text{Max}(x, \text{Max}(y, z))$$

[Math 2]

$$\text{Min}(x, y) = \begin{cases} x & (x \leq y) \\ y & (x > y) \end{cases} \quad \text{(Equation 2)}$$

[Math 3]

$$\text{Min}(x, y) = \begin{cases} x & (x \geq y) \\ y & (x < y) \end{cases} \quad \text{(Equation 3)}$$

The image coding apparatus generates a predicted motion vector PMvL1 corresponding to the second prediction direction, using an adjacent block having a motion vector in the second prediction direction, when coding the motion vector MvL1 in the second prediction direction for the current block. More specifically, the image coding apparatus generates the predicted motion vector PMvL1 using the motion vector MvL1_A of the adjacent block A and the motion vector MvL1_C of the adjacent block C.

In other words, the image coding apparatus uses a motion vector in the second prediction direction of an adjacent block to the current block, when coding the motion vector MvL1 in the second prediction direction of the current block. Then, the image coding apparatus codes a differential motion vector that is a difference between the motion vector MvL1 and the predicted motion vector PMvL1. The predicted motion vector PMvL1 is calculated using Median (MvL1_A, 0, and MvL1_C) and others.

SUMMARY OF THE INVENTION

When the number of motion vectors in the same prediction direction is less, the number of motion vectors to be used for calculating a predicted motion vector is less. In such a case, the coding efficiency of the motion vectors will not be improved.

In the conventional method of calculating a predicted motion vector, the image coding apparatus uses only the motion vectors in the first prediction direction of adjacent blocks, when calculating the predicted motion vector PMvL0 in the first prediction direction of the current block as described above. Here, the image coding apparatus does not use the motion vectors in the second prediction direction of the adjacent blocks.

Furthermore, the image coding apparatus uses only the motion vectors in the second prediction direction of adjacent blocks, when calculating the predicted motion vector PMvL1 in the second prediction direction of the current block. Here, the image coding apparatus does not use the motion vectors in the first prediction direction of the adjacent blocks.

In other words, the motion vectors of adjacent blocks to be used for calculating a predicted motion vector are limited in the conventional method. Thus, the optimal motion vector is not derived, and the coding efficiency will not be improved.

Thus, the present invention has an object of providing an image coding method and an image decoding method for deriving a predicted motion vector suitable for improving the coding efficiency of a motion vector.

In order to solve the problems, an image coding method according to an aspect of the present invention is a method of coding a current picture per block with prediction using one or both of a first reference picture list and a second reference picture list, and includes: adding, to a candidate list, a first adjacent motion vector as a candidate for a predicted motion vector to be used for coding a current motion vector, the first adjacent motion vector being a motion vector of a block adjacent to a current block included in the current picture, and the current motion vector being a motion vector of the current block; selecting the predicted motion vector to be used for coding the current motion vector, from the candidate list including the first adjacent motion vector; and coding the current motion vector using the selected predicted motion vector, wherein in the adding, the first adjacent motion vector is added to the candidate list for the current motion vector, the first adjacent motion vector indicating a position in a first reference picture included in the first reference picture list, and the current motion vector indicating a position in a second reference picture included in the second reference picture list.

Accordingly, the adjacent motion vector corresponding to the first reference picture list is added to the candidate list corresponding to the second reference picture list. Accordingly, the number of the options of predicted motion vectors increases. Thus, it is possible to derive a predicted motion vector suitable for improving the coding efficiency of the current motion vector.

Furthermore, in the adding, a second adjacent motion vector may be further added, the second adjacent motion vector being a motion vector of the adjacent block and indicating a position in a third reference picture included in the second reference picture list.

Accordingly, the adjacent motion vector corresponding to the second reference picture list is added to the candidate list corresponding to the second reference picture list. Accordingly, the number of the options of predicted motion vectors increases. Thus, it is possible to derive a predicted motion vector suitable for improving the coding efficiency of the current motion vector.

Furthermore, in the adding: it may be determined whether or not the second reference picture is identical to the third reference picture; the second adjacent motion vector may be added to the candidate list when it is determined that the second reference picture is identical to the third reference picture; it may be determined whether or not the second reference picture is identical to the first reference picture; and the first adjacent motion vector may be added to the candidate list when it is determined that the second reference picture is identical to the first reference picture.

Accordingly, only when the reference picture corresponding to the current motion vector is identical to the reference picture corresponding to the adjacent motion vector, the adjacent motion vector is added to the candidate list. Thus, only when the adjacent motion vector is appropriate as a candidate for a predicted motion vector, the adjacent motion vector is added to the candidate list. Thus, an appropriate predicted motion vector is derived.

Furthermore, in the adding: it may be determined whether or not the second reference picture is identical to the first reference picture when it is determined that the second reference picture is not identical to the third reference picture; and the first adjacent motion vector may be added to the candidate list when it is determined that the second reference picture is not identical to the third reference picture and that the second reference picture is identical to the first reference picture.

Accordingly, when the current motion vector corresponds to the second reference picture list, the adjacent motion vector corresponding to the second reference picture list is preferentially added to the candidate list. Thus, a more appropriate adjacent motion vector is added to the candidate list as a candidate for a predicted motion vector.

Furthermore, in the adding: it may be determined whether or not the second reference picture is identical to the third reference picture by determining whether or not a display order of the second reference picture identified by the second reference picture list and a second reference index is identical to a display order of the third reference picture identified by the second reference picture list and a third reference index; and it may be determined whether or not the second reference picture is identical to the first reference picture by determining whether or not the display order of the second reference picture identified by the second reference picture list and the second reference index is identical to a display order of the first reference picture identified by the first reference picture list and a first reference index.

Accordingly, whether or not the reference picture identified by the first reference picture list is identical to the reference picture identified by the second reference picture list is appropriately determined based on the display orders.

Furthermore, in the adding, a motion vector having a magnitude of 0 may be added as the candidate for the predicted motion vector, when it is determined that the second reference picture is not identical to the third reference picture and that the second reference picture is not identical to the first reference picture.

Accordingly, decrease in the number of candidates is suppressed. Thus, a state where no candidate exists in the candidate list is avoided.

Furthermore, in the adding, a plurality of index values and a plurality of candidates for the predicted motion vector may be added to the candidate list so that the index values are in one-to-one correspondence with the candidates for the predicted motion vector, in the selecting, an index value may be selected from the candidate list as the predicted motion vector, and in the coding, the selected index value may be coded so that a code of the index value is longer as the index value is larger.

Accordingly, the selected predicted motion vector is appropriately coded. Thus, the coder and the decoder select the same predicted motion vector.

Furthermore, in the adding, the first adjacent motion vector of the adjacent block may be added to the candidate list, the adjacent block being one of a left adjacent block, an above-adjacent block, and an upper right adjacent block with respect to the current block.

Accordingly, a plurality of adjacent motion vectors is added to the candidate list as candidates for the predicted motion vector. Accordingly, the number of the options of predicted motion vectors increases.

Furthermore, an image decoding method according to an aspect of the present invention may be a method of decoding a current picture per block with prediction using one or both of a first reference picture list and a second reference picture list, and include: adding, to a candidate list, a first adjacent motion vector as a candidate for a predicted motion vector to be used for decoding a current motion vector, the first adjacent motion vector being a motion vector of a block adjacent to a current block included in the current picture, and the current motion vector being a motion vector of the current block; selecting the predicted motion vector to be used for decoding the current motion vector, from the candidate list including the first adjacent motion vector; and decoding the current motion vector using the selected predicted motion vector, wherein in the adding, the first adjacent motion vector may be added to the candidate list for the current motion vector, the first adjacent motion vector indicating a position in a first reference picture included in the first reference picture list, and the current motion vector indicating a position in a second reference picture included in the second reference picture list.

Accordingly, the adjacent motion vector corresponding to the first reference picture list is added to the candidate list corresponding to the second reference picture list. Accordingly, the number of the options of predicted motion vectors increases. Thus, it is possible to derive a predicted motion vector suitable for improving the coding efficiency of the current motion vector.

Furthermore, in the adding, a second adjacent motion vector may be further added, the second adjacent motion vector being a motion vector of the adjacent block and indicating a position in a third reference picture included in the second reference picture list.

Accordingly, the adjacent motion vector corresponding to the second reference picture list is added to the candidate list corresponding to the second reference picture list. Accordingly, the number of the options of predicted motion vectors increases. Thus, it is possible to derive a predicted motion vector suitable for improving the coding efficiency of the current motion vector.

Furthermore, in the adding: it may be determined whether or not the second reference picture is identical to the third reference picture; the second adjacent motion vector may be added to the candidate list when it is determined that the second reference picture is identical to the third reference picture; it may be determined whether or not the second reference picture is identical to the first reference picture; and the first adjacent motion vector may be added to the candidate list when it is determined that the second reference picture is identical to the first reference picture.

Accordingly, only when the reference picture corresponding to the current motion vector is identical to the reference picture corresponding to the adjacent motion vector, the adjacent motion vector is added to the candidate list. Thus, only when the adjacent motion vector is appropriate as a candidate for a predicted motion vector, the adjacent motion vector is added to the candidate list. Thus, an appropriate predicted motion vector is derived.

Furthermore, in the adding: it may be determined whether or not the second reference picture is identical to the first reference picture when it is determined that the second reference picture is not identical to the third reference picture; and the first adjacent motion vector may be added to the candidate list when it is determined that the second reference picture is not identical to the third reference picture and that the second reference picture is identical to the first reference picture.

Accordingly, when the current motion vector corresponds to the second reference picture list, the adjacent motion vector corresponding to the second reference picture list is preferentially added to the candidate list. Thus, a more appropriate adjacent motion vector is added to the candidate list as a candidate for a predicted motion vector.

Furthermore, in the adding: it may be determined whether or not the second reference picture is identical to the third reference picture by determining whether or not a display order of the second reference picture identified by the second reference picture list and a second reference index is identical to a display order of the third reference picture identified by the second reference picture list and a third reference index; and it may be determined whether or not the second reference picture is identical to the first reference picture by determining whether or not the display order of the second reference picture identified by the second reference picture list and the second reference index is identical to a display order of the first reference picture identified by the first reference picture list and a first reference index.

Accordingly, whether or not the reference picture identified by the first reference picture list is identical to the reference picture identified by the second reference picture list is appropriately determined based on the display orders.

Furthermore, in the adding, a motion vector having a magnitude of 0 may be added as the candidate for the predicted motion vector, when it is determined that the second reference picture is not identical to the third reference picture and that the second reference picture is not identical to the first reference picture.

Accordingly, decrease in the number of candidates is suppressed. Thus, a state where no candidate exists in the candidate list is avoided.

Furthermore, in the adding, a plurality of index values and a plurality of candidates for the predicted motion vector may be added to the candidate list so that the index values are in one-to-one correspondence with the candidates for the predicted motion vector, in the decoding, an index value may be decoded, the index value being coded so that a code of the index value is longer as the index value is larger, and in the selecting, the predicted motion vector corresponding to the decoded index value may be selected from the candidate list.

Accordingly, the selected predicted motion vector is appropriately decoded. Thus, the coder and the decoder select the same predicted motion vector.

Furthermore, in the adding, the first adjacent motion vector of the adjacent block may be added to the candidate list, the adjacent block being one of a left adjacent block, an above-adjacent block, and an upper right adjacent block with respect to the current block.

Accordingly, a plurality of adjacent motion vectors is added to the candidate list as candidates for the predicted motion vector. Accordingly, the number of the options of predicted motion vectors increases.

Furthermore, an image coding apparatus according to an aspect of the present invention may be an image coding apparatus that codes a current picture per block with prediction using one or both of a first reference picture list and a second reference picture list, and include: an addition unit configured to add, to a candidate list, a first adjacent motion vector as a candidate for a predicted motion vector to be used for coding a current motion vector, the first adjacent motion vector being a motion vector of a block adjacent to a current block included in the current picture, and the current motion vector being a motion vector of the current block; a selecting unit configured to select the predicted motion vector to be used for coding the current motion vector, from the candidate list including the first adjacent motion vector; and a coding unit configured to code the current motion vector using the selected predicted motion vector, wherein the addition unit may be configured to add the first adjacent motion vector to the candidate list for the current motion vector, the first adjacent motion vector indicating a position in a first reference picture included in the first reference picture list, and the current motion vector indicating a position in a second reference picture included in the second reference picture list.

Accordingly, the image coding method is implemented as the image coding apparatus.

Furthermore, an image decoding apparatus according to an aspect of the present invention may be an image decoding apparatus that decodes a current picture per block with prediction using one or both of a first reference picture list and a second reference picture list, and include: an addition unit configured to add, to a candidate list, a first adjacent motion vector as a candidate for a predicted motion vector to be used for decoding a current motion vector, the first adjacent motion vector being a motion vector of a block adjacent to a current block included in the current picture, and the current motion vector being a motion vector of the current block; a selecting unit configured to select the predicted motion vector to be used for decoding the current motion vector, from the candidate list including the first adjacent motion vector; and a decoding unit configured to decode the current motion vector using the selected predicted motion vector, wherein the addition unit may be configured to add the first adjacent motion vector to the candidate list for the current motion vector, the first adjacent motion vector indicating a position in a first reference picture included in the first reference picture list, and the current motion vector indicating a position in a second reference picture included in the second reference picture list.

Accordingly, the image decoding method is implemented as the image decoding apparatus.

Furthermore, an image coding and decoding apparatus according to an aspect of the present invention may be an image coding and decoding apparatus that codes a current picture per block and decodes a current picture per block, with prediction using one or both of a first reference picture list and a second reference picture list, and include: an addition unit configured to add, to a candidate list, a first adjacent motion vector as a candidate for a predicted motion vector to be used for coding or decoding a current motion vector, the first adjacent motion vector being a motion vector of a block adjacent to a current block to be processed and included in the current picture to be coded or decoded, and the current motion vector being a motion vector of the current block; a selecting unit configured to select the predicted motion vector to be used for coding or decoding the current motion vector, from the candidate list including the first adjacent motion vector; a coding unit configured to code the current motion vector using the selected predicted motion vector; and a decoding unit configured to decode the current motion vector using the selected predicted motion vector, wherein the addition unit may be configured to add the first adjacent motion vector to the candidate list for the current motion vector, the first adjacent motion vector indicating a position in a first reference picture included in the first reference picture list, and the current motion vector indicating a position in a second reference picture included in the second reference picture list.

Accordingly, the image coding and decoding apparatus implements both of the functions of the image coding apparatus and the image decoding apparatus.

According to the present invention, a predicted motion vector suitable for improving the coding efficiency of a motion vector is derived. Accordingly, it is possible to improve the coding efficiency of the motion vector.

BRIEF DESCRIPTION OF THE DRAWINGS

These and other objects, advantages and features of the invention will become apparent from the following description thereof taken in conjunction with the accompanying drawings that illustrate a specific embodiment of the present invention. In the Drawings:

FIG. 6B illustrates an example of a candidate list for the second prediction direction according to Embodiment 1;

FIG. 7 illustrates an example of codes of predicted motion vector indexes according to Embodiment 1;

FIG. 10 illustrates a flowchart of operations performed by the image decoding apparatus according to Embodiment 2;

FIG. 20 illustrates a structure of multiplexed data;

DESCRIPTION OF THE PREFERRED EMBODIMENTS

Embodiments of the present invention will be described with reference to drawings. Embodiments described hereinafter indicate favorable and specific examples of the present invention. The values, shapes, materials, constituent elements, positions and connections of the constituent elements, steps, and orders of the steps indicated in Embodiments are examples, and do not limit the present invention. The present invention are limited only according to Claims. Although the constituent elements that are not described in independent Claims that describe the most generic concept of the present invention are not necessary to solve the problems of the present invention, they are described as components of the favorable embodiments.

Furthermore, the first reference picture list corresponds to the L0 prediction, and the second reference picture list corresponds to the L1 prediction. Furthermore, the first reference picture list corresponds to the first prediction direction, and the second reference picture list corresponds to the second prediction direction. Conversely, the first reference picture list may correspond to the L1 prediction, and the second reference picture list may correspond to the L0 prediction. Similarly, the first reference picture list may correspond to the second prediction direction, and the second reference picture list may correspond to the first prediction direction.

Embodiment 1

Figure 1:
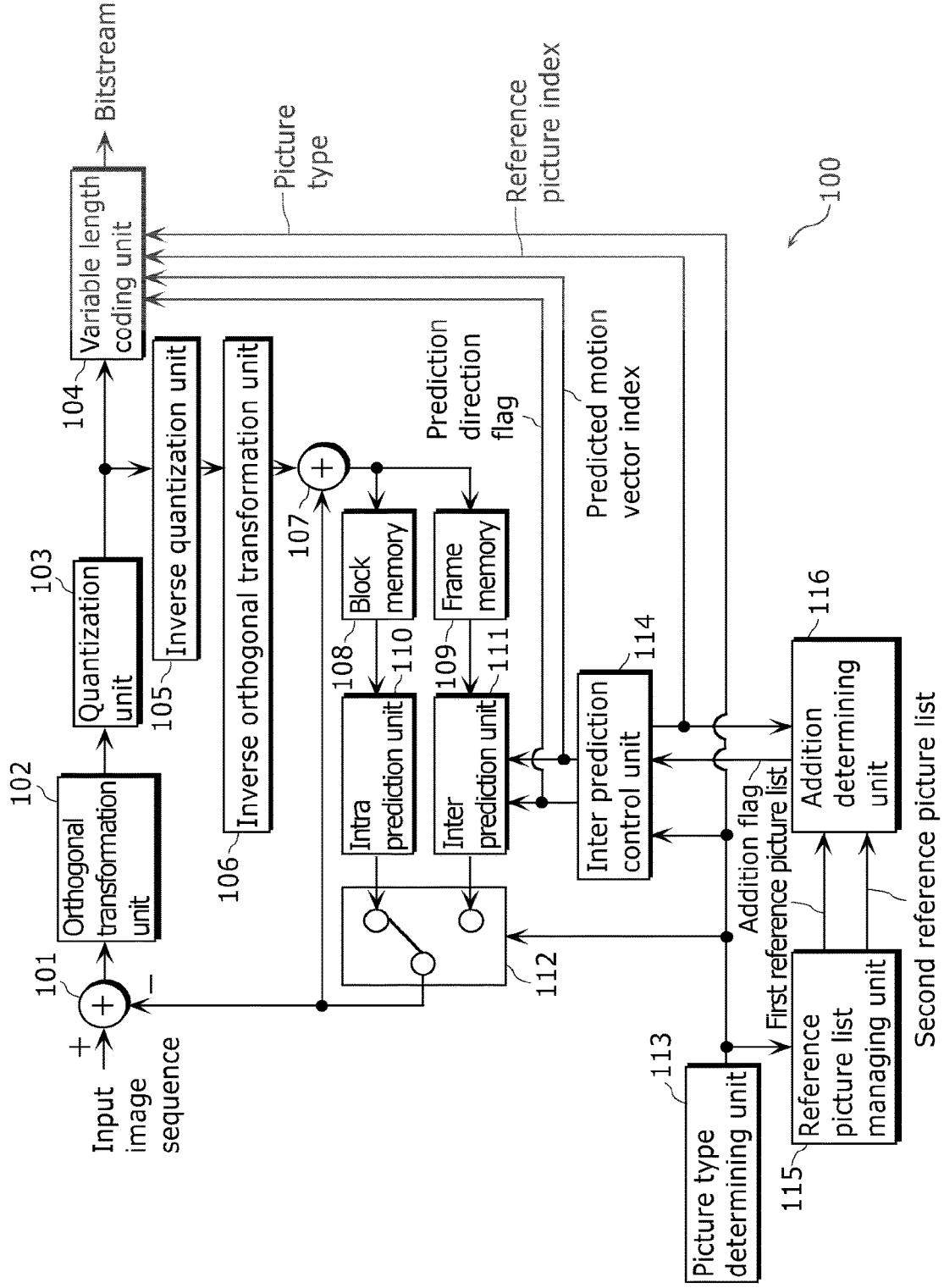
FIG. 1 illustrates a configuration of an image coding apparatus according to Embodiment 1.

FIG. 1 is a block diagram illustrating a configuration of an image coding apparatus according to Embodiment 1.

An image coding apparatus 100 in FIG. 1 includes an orthogonal transformation unit 102, a quantization unit 103, an inverse quantization unit 105, an inverse orthogonal transformation unit 106, a block memory 108, a frame memory 109, an intra prediction unit 110, an inter prediction unit 111, an inter prediction control unit 114, a picture type determining unit 113, a reference picture list managing unit 115, an addition determining unit 116, a variable length coding unit 104, a subtracting unit 101, an addition unit 107, and a switch unit 112.

The orthogonal transformation unit 102 performs transformation on predicted error data between predicted image data generated by a unit to be described later and an input image sequence from an image domain to a frequency domain. The quantization unit 103 quantizes the predicted error data transformed into the frequency domain. The inverse quantization unit 105 inversely quantizes the predicted error data quantized by the quantization unit 103. The inverse orthogonal transformation unit 106 performs transformation on the predicted error data inversely quantized by the inverse quantization unit 105 from the frequency domain to the image domain.

The block memory 108 is a memory for storing a decoded image generated from the predicted image data and the predicted error data inversely quantized by the inverse quantization unit 105 per block. The frame memory 109 is a memory for storing the decoded image per frame.

The picture type determining unit 113 determines in which picture type an input picture sequence is coded, either I-picture, B-picture, or P-picture, and generates picture type information. The intra prediction unit 110 generates the predicted image data through intra prediction of the current block, using the decoded image stored per block in the block memory 108. The inter prediction unit 111 generates the predicted image data through inter prediction of the current block, using the decoded image stored per frame in the frame memory 109.

The reference picture list managing unit 115 generates a reference list with the display orders of reference picture indexes for allocating the reference picture indexes to coded reference pictures to be referred to in the inter prediction. Although the reference picture list managing unit 115 manages the reference pictures by the reference picture indexes and the display orders in Embodiment 1, it may manage the reference pictures by the reference picture indexes and the coding orders.

The addition determining unit 116 determines whether or not a candidate for a predicted motion vector (candidate predicted motion vector) is added with reference to the first and second reference picture lists generated by the reference picture list managing unit 115. More specifically, the addition determining unit 116 determines whether or not a candidate predicted motion vector in the first prediction direction is added to a candidate list for the second prediction direction of the coded block, in a method to be described later. Then, the addition determining unit 116 sets an addition flag.

The inter prediction control unit 114 determines a predicted motion vector to be used for coding so as to code a motion vector using one of the candidate predicted motion vectors having the smallest error with the motion vector derived from the motion estimation. Here, the error is a difference value between the candidate predicted motion vector and the motion vector derived from the motion estimation.

Furthermore, the inter prediction control unit 114 generates a predicted motion vector index corresponding to the determined predicted motion vector, per block. The inter prediction control unit 114 transmits the predicted motion vector index, the error information of the candidate predicted motion vectors, and the reference picture indexes to the variable length coding unit 104.

The variable length coding unit 104 variable-length-codes the quantized prediction error data, an inter prediction direction flag, the reference picture indexes, and the picture type information to generate a bitstream.

Figure 2:
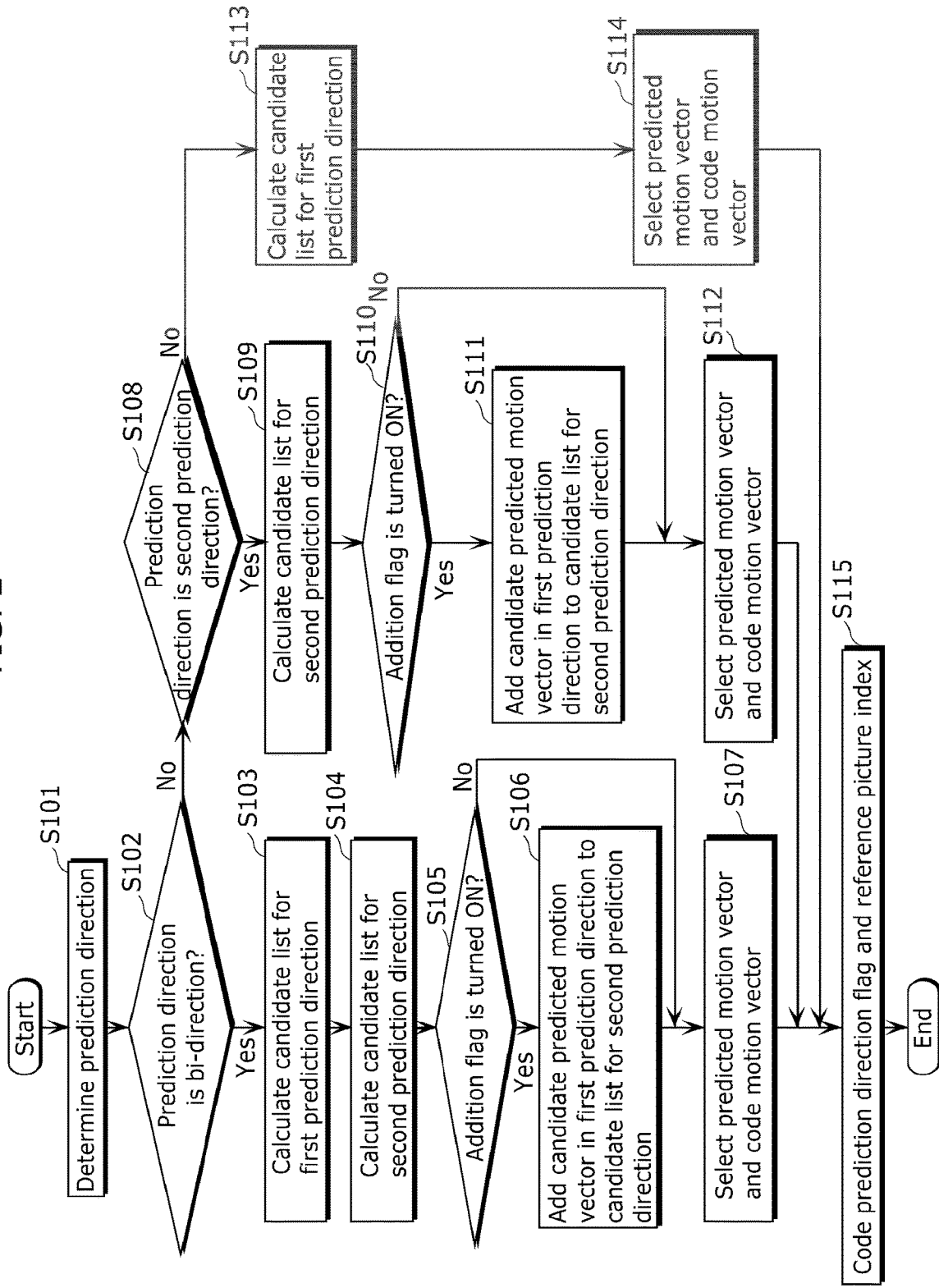
FIG. 2 illustrates a flowchart of operations performed by the image coding apparatus according to Embodiment 1.

FIG. 2 is the outline procedure of processes of the image coding method according to Embodiment 1. The inter prediction control unit 114 determines a prediction direction when the current block is coded in the motion vector estimation mode (S101). Next, the inter prediction control unit 114 determines whether or not the prediction direction in the motion vector estimation mode is the bi-directional prediction (S102).

When the prediction direction is the bi-directional prediction (Yes at S102), the inter prediction control unit 114 calculates a candidate predicted motion vector list for each of the first and second prediction directions in a method to be described later (S103, S104).

Next, the addition determining unit 116 determines whether or not the candidate predicted motion vector in the first prediction direction is added to the candidate predicted motion vector list for the second prediction direction (S105). When the addition determining unit 116 determines that the candidate predicted motion vector in the first prediction direction is added (Yes at S105), the inter prediction control unit 114 adds the candidate predicted motion vector in the first prediction direction to the candidate predicted motion vector list for the second prediction direction (S106).

Next, the inter prediction control unit 114 selects the predicted motion vector in the first prediction direction from the candidate predicted motion vector list for the first prediction direction, and the predicted motion vector in the second prediction direction from the candidate predicted motion vector list for the second prediction direction. Then, the variable length coding unit 104 codes the predicted motion vector indexes corresponding to the selected predicted motion vectors, and adds the indexes to a bitstream (S107).

When the prediction direction in the motion vector estimation mode is the one-directional prediction (No at S102), the inter prediction control unit 114 determines whether or not the prediction direction in the motion vector estimation mode is the second prediction direction (S108).

When the prediction direction is the second prediction direction (Yes at S108), the inter prediction control unit 114 calculates a candidate predicted motion vector in the second prediction direction (S109). Next, the addition determining unit 116 determines whether or not the candidate predicted motion vector in the first prediction direction is added to the candidate predicted motion vector list for the second prediction direction (S110). When the addition determining unit 116 determines that the candidate predicted motion vector in the first prediction direction is added (Yes at S110), the inter prediction control unit 114 adds the candidate predicted motion vector in the first prediction direction to the candidate predicted motion vector list for the second prediction direction (S111).

Next, the inter prediction control unit 114 selects the predicted motion vector in the second prediction direction from the candidate predicted motion vector list for the second prediction direction. Then, the variable length coding unit 104 codes a predicted motion vector index corresponding to the selected predicted motion vector, and adds the coded index to a bitstream (S112).

When the prediction direction is not the second prediction direction (No at S108), the inter prediction control unit 114 calculates a candidate predicted motion vector in the first prediction direction (S113). Next, the inter prediction control unit 114 selects the predicted motion vector in the first prediction direction from the candidate predicted motion vector list for the first prediction direction. Then, the variable length coding unit 104 codes a predicted motion vector index corresponding to the selected predicted motion vector, and adds the coded index to a bitstream (S114).

Finally, the variable length coding unit 104 codes a reference picture index and an inter prediction direction flag indicating a prediction direction of the motion vector estimation mode, and adds the inter prediction direction flag and the reference picture index to a bitstream (S115).

Figure 3:
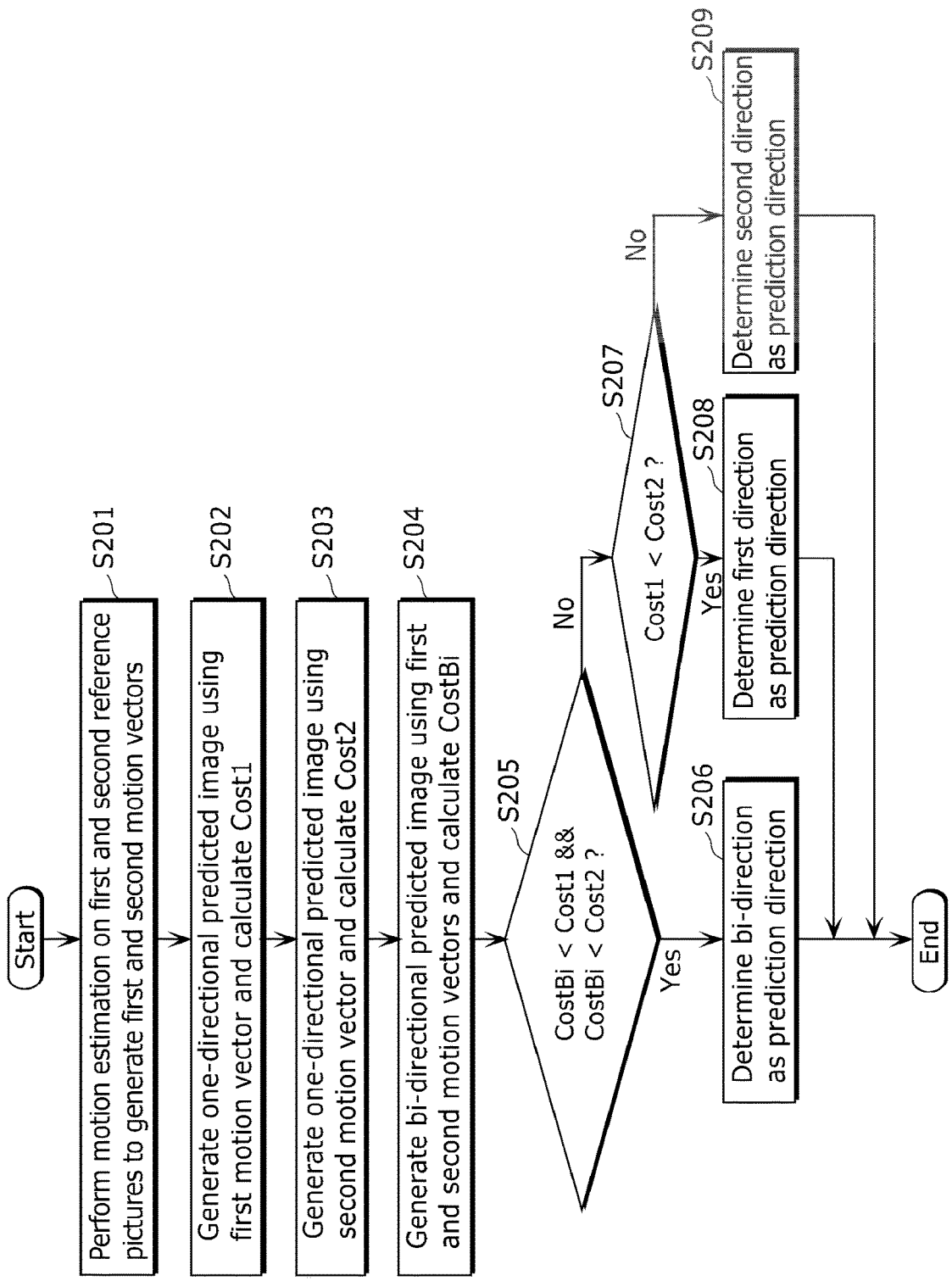
FIG. 3 illustrates a flowchart of processes for determining a prediction direction according to Embodiment 1.

Next, a method of determining a prediction direction in the motion vector estimation mode (S101) in FIG. 2 will be described in detail with reference to a procedure of processes in FIG. 3. The inter prediction control unit 114 performs motion estimation on the reference picture identified by the reference picture index in the first prediction direction and the reference picture identified by the reference picture index in the second prediction direction. Then, the inter prediction control unit 114 generates the first and second motion vectors corresponding to the two reference pictures (S201).

Here, the inter prediction control unit 114 calculates difference values between the current block to be coded in a picture to be coded and blocks in each of the reference pictures in the motion estimation. Then, the inter prediction control unit 114 determines the block having the smallest difference value as a reference block, among the blocks in the reference picture. Then, the inter prediction control unit 114 calculates a motion vector with reference to a position of the current block and a position of the reference block.

Next, the inter prediction unit 111 generates a predicted image in the first prediction direction, using the calculated first motion vector. The inter prediction control unit 114 calculates Cost1 that is a cost when the current block is coded using the predicted image by, for example, an R-D optimization model represented by the following Equation 4 (S202).

$$\text{Cost} = D + \lambda \times R \qquad \text{(Equation 4)}$$

In Equation 4, D denotes coding artifacts. More specifically, D is, for example, a sum of absolute differences between (i) pixel values obtained by coding and decoding the current block using the predicted image generated from a certain motion vector and (ii) original pixel values of the current block. Furthermore, R denotes a generated code amount. More specifically, R is, for example, a necessary code amount for coding a motion vector used for generating a predicted image. Furthermore, X denotes a Lagrange's method of undetermined multiplier.

Next, the inter prediction unit 111 generates a predicted image in the second prediction direction, using the calculated second motion vector. Then, the inter prediction control unit 114 calculates Cost2 from Equation 4 (S203).

Next, the inter prediction unit 111 generates a bi-directional predicted image using the calculated first and second motion vectors. Here, the inter prediction unit 111 generates the bi-directional predicted image by averaging, per pixel, the predicted image obtained from the first motion vector and the predicted image obtained from the second motion vector. Then, the inter prediction control unit 114 calculates CostBi from Equation 4 (S204).

Then, the inter prediction control unit 114 compares Cost1, Cost2, and CostBi (S205). When CostBi is the smallest (Yes at S205), the inter prediction control unit 114 determines the bi-directional prediction as the prediction direction of the motion vector estimation mode (S206). When CostBi is not the smallest (No at S205), the inter prediction control unit 114 compares Cost1 and Cost2 (S207).

When Cost1 is smaller (Yes at S207), the inter prediction control unit 114 determines the one-directional prediction in the first prediction direction as the motion vector estimation mode (S208). When Cost1 is not smaller (No at S207), the inter prediction control unit 114 determines the one-directional prediction in the second prediction direction as the motion vector estimation mode (S209).

Although the inter prediction unit 111 averages the images for each of the pixels when the bi-directional predicted image is generated in Embodiment 1, it may calculate a weighted average of the images and others.

Next, a method of calculating a candidate predicted motion vector list in FIG. 2 (S103, S104, S109, and S113) will be described in detail with reference to a procedure of processes in FIG. 4. The inter prediction control unit 114 determines an adjacent block A to the left of the current block, an adjacent block B above the current block, and an adjacent block C to the upper right of the current block (S301).

For example, the inter prediction control unit 114 determines, as the adjacent block A, a block to which an adjacent pixel to the left of the pixel located in the top left corner of the current block belongs. Furthermore, the inter prediction control unit 114 determines, as the adjacent block B, a block to which an adjacent pixel above the pixel located in the top left corner of the current block belongs. Furthermore, the inter prediction control unit 114 determines, as the adjacent block C, a block to which an adjacent pixel to the upper right of the upper right corner of the current block belongs.

Next, the inter prediction control unit 114 determines whether or not each of the adjacent blocks A, B, and C satisfies both of two conditions (S302). One of the conditions is that the adjacent block N (N is one of A, B, and C) has a motion vector in a prediction direction identical to that of the motion vector of the current block. The other is that a reference picture of the adjacent block N is identical to that of the current block.

When the adjacent block N satisfies the two conditions (Yes at S302), the inter prediction control unit 114 adds adjacent motion vectors of the adjacent block N to a candidate predicted motion vector list (S303). Furthermore, the inter prediction control unit 114 calculates a median value (central value) of the motion vectors of the adjacent block, and adds the median value to the candidate predicted motion vector list (S304).

The inter prediction control unit 114 adds the motion vector of the adjacent block having the prediction direction identical to that of the corresponding motion vector of the current block, to the candidate predicted motion vector list. Then, the inter prediction control unit 114 does not add a motion vector of the adjacent block having a prediction direction different from that of the motion vector of the current block. However, the inter prediction control unit 114 may add a motion vector of the adjacent block having a prediction direction different from that of the motion vector of the current block, to the candidate predicted motion vector list by setting the motion vector to be added to 0.

Next, a method of determining an addition flag in FIG. 2 (S105, S110) will be described.

There is a case where the reference picture indicated by the reference index of the first prediction direction of the adjacent block is identical to the reference picture indicated by the reference index of the second prediction direction of the current block. Generally, the motion vector in the first prediction direction of the adjacent block tends to have a value relatively close to the value of the motion vector in the second prediction direction of the current block.

Thus, in such a case, the inter prediction control unit 114 adds the motion vector in the first prediction direction of the adjacent block as a candidate predicted motion vector in the second prediction direction of the current block. In other words, the inter prediction control unit 114 adds the candidate predicted motion vector in the first prediction direction of the current block as the candidate predicted motion vector in the second prediction direction.

As such, the image coding apparatus 100 adds not only the motion vector in the second prediction direction of the adjacent block but also the motion vector in the first prediction direction, as the candidate predicted motion vectors in the second prediction direction of the current block to perform efficient coding.

In Embodiment 1, not limited to this configuration, the inter prediction control unit 114 adds the candidate predicted motion vector in the first prediction direction of the current block as the candidate predicted motion vector in the second prediction direction.

For example, there is a case where the reference picture in the second prediction direction of the adjacent block is identical to the reference picture in the first prediction direction of the current block. Thus, in such a case, the inter prediction control unit 114 may add the motion vector in the second prediction direction of the adjacent block as a candidate predicted motion vector in the first prediction direction of the current block.

In other words, the inter prediction control unit 114 may add the candidate predicted motion vector in the second prediction direction of the current block as the candidate predicted motion vector in the first prediction direction. In this configuration, the image coding apparatus 100 can efficiently code the motion vectors.

Furthermore, the variable length coding unit 104 may code the addition flag, and adds the flag to a bitstream. Accordingly, a decoder can determine whether or not the candidate predicted motion vector in the first prediction direction should be added with reference to the addition flag. Thus, the computing amount in decoding can be reduced.

Furthermore, the variable length coding unit 104 may add an addition flag per block. Accordingly, it is possible to perform the flexible switching. Furthermore, the variable length coding unit 104 may add an addition flag per picture. Accordingly, it is possible to improve the coding efficiency and reduce the computing amount of the decoder.

Next, a method of determining an addition flag will be described in detail with reference to FIG. 5.

The addition determining unit 116 obtains a reference picture index of the second prediction direction of the current block (S401). Furthermore, the inter prediction control unit 114 obtains reference picture indexes of the first prediction direction of the adjacent blocks A, B, and C (S402).

Next, the addition determining unit 116 determines whether or not the reference picture indicated by the reference picture index of the second prediction direction of the current block is identical to the reference picture indicated by the reference picture index of the first prediction direction of the adjacent block (S403). Here, the addition determining unit 116 makes the determination using the first and second reference picture lists.

For example, the addition determining unit 116 obtains, from the second reference picture list, the display order of the reference picture indicated by the reference picture index of the second prediction direction of the current block. Furthermore, the addition determining unit 116 obtains, from the first reference picture list, the display order of the reference picture indicated by the reference picture index of the first prediction direction of the adjacent block. The addition determining unit 116 compares these two display orders. When determining that the orders are identical to each other, the addition determining unit 116 determines that the two reference pictures are identical.

When the reference picture in the second prediction direction of the current block is identical to the reference picture in the first prediction direction of the adjacent block (Yes at S403), the addition determining unit 116 turns ON the addition flag (S404). When the reference picture in the second prediction direction of the current block is not identical to the reference picture in the first prediction direction of the adjacent block (No at S403), the addition determining unit 116 turns OFF the addition flag (S405).

In Embodiment 1, the addition determining unit 116 determines whether or not the two reference pictures are identical to each other with reference to the display orders. However, the addition determining unit 116 may determine whether or not the two reference pictures are identical to each other with reference to the coding orders and others. Furthermore, the addition determining unit 116 may perform the processes in FIG. 5 only when a result of the determination in FIG. 4 is false (No at S302).

Figure 4:
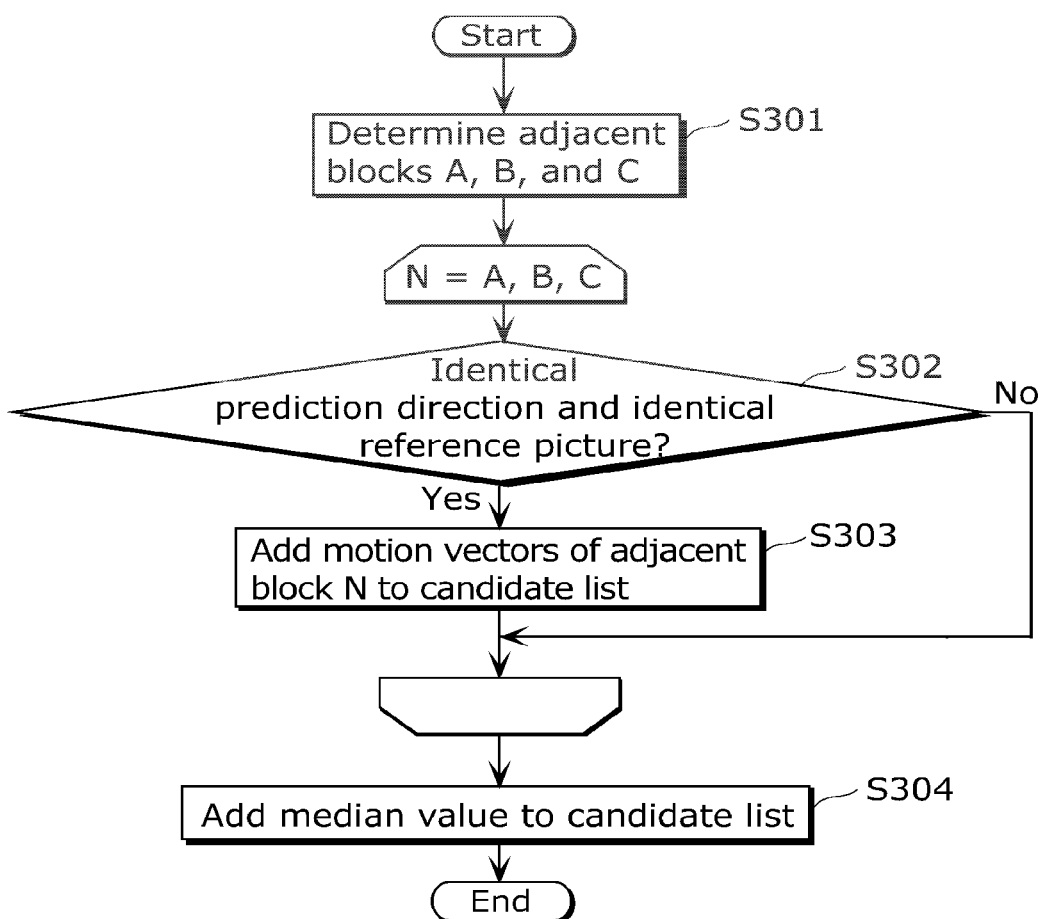
FIG. 4 illustrates a flowchart of processes for calculating a candidate list according to Embodiment 1.

When a result of the determination in FIG. 4 is true (Yes at S302), the inter prediction control unit 114 adds the motion vector in the second prediction direction of the adjacent block as a candidate predicted motion vector in the second prediction direction of the current block. Here, adding again the motion vector in the first prediction direction of the adjacent block as a candidate predicted motion vector in the second prediction direction of the current block is redundant.

Figures 5, 6A:
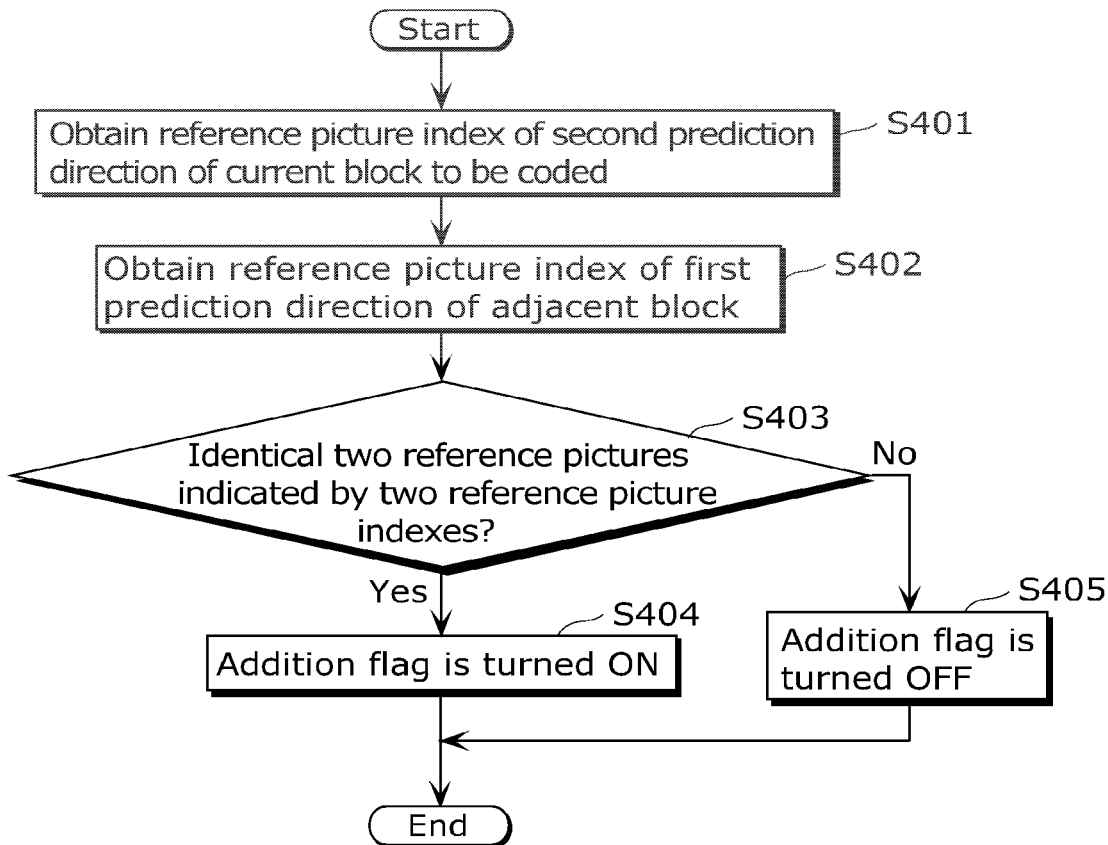
FIG. 5 illustrates a flowchart of processes for determining an addition flag according to Embodiment 1.
FIG. 6A illustrates an example of a candidate list for the first prediction direction according to Embodiment 1.

Thus, the addition determining unit 116 may perform the processes in FIG. 5 only when a result of the determination in FIG. 4 is false (No at S302). Accordingly, only when the motion vector in the second prediction direction of the adjacent block is not the candidate predicted motion vector in the second prediction direction of the current block, the inter prediction control unit 114 can add the motion vector in the first prediction direction of the adjacent block as a candidate predicted motion vector in the second prediction direction of the current block. Accordingly, it is possible to improve the coding efficiency.

Figure 34:
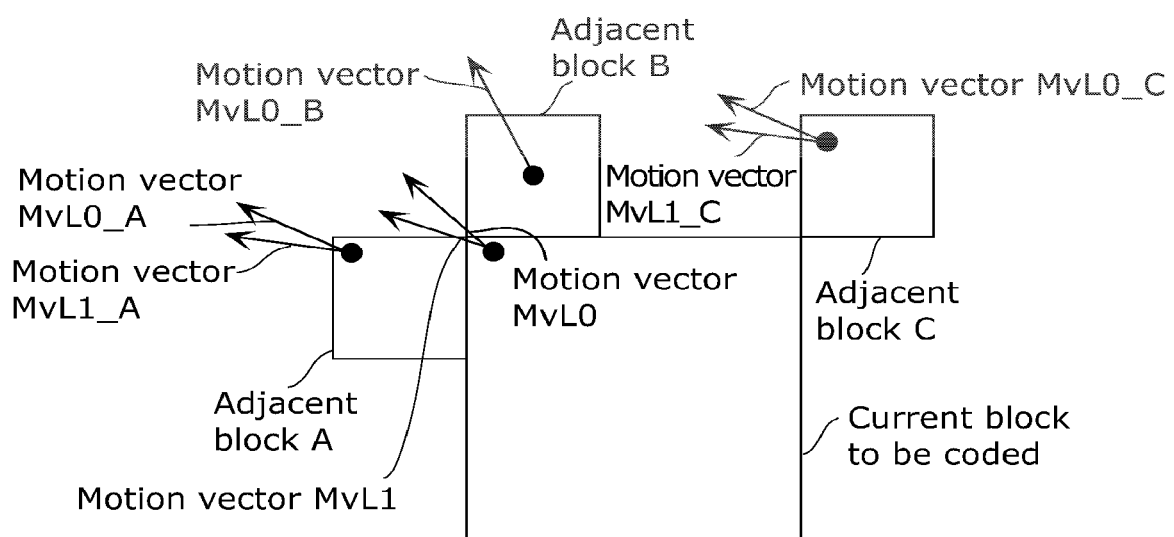
FIG. 34 illustrates an example of the current block to be coded and the three adjacent blocks.

Next, an example of a candidate predicted motion vector list generated with the processes (S103 to S106) in FIG. 2 when the current block has the motion vector MvL0 in the first prediction direction and the motion vector MvL1 in the second prediction direction as illustrated in FIG. 34 will be described with reference to FIGS. 6A and 6B.

The following relationship will be assumed in FIG. 34. In other words, the reference picture in the first prediction direction of the current block is identical to the reference picture in the first prediction direction of each of the adjacent blocks A, B, and C. Furthermore, the reference picture in the second prediction direction of the current block, the reference picture in the second prediction direction of each of the adjacent blocks A and C, and the reference picture in the first prediction direction of the adjacent block B are identical to each other.

In the candidate predicted motion vector list for the first prediction direction of FIG. 6A, the predicted motion vector index corresponding to Median (MvL0_A, MvL0_B, MvL0_C) is 0. The predicted motion vector index corresponding to the motion vector MvL0_A is 1. The predicted motion vector index corresponding to the motion vector MvL0_B is 2. The predicted motion vector index corresponding to the motion vector MvL0_C is 3.

In the candidate predicted motion vector list for the second prediction direction of FIG. 6B, the predicted motion vector index corresponding to Median (MvL1_A, MvL0_B, MvL1_C) is 0. The predicted motion vector index corresponding to the motion vector MvL1_A is 1. The predicted motion vector index corresponding to the motion vector MvL0_B is 2. The predicted motion vector index corresponding to the motion vector MvL1_C is 3.

Here, when the candidate predicted motion vector list for the second prediction direction does not have a motion vector MvL1_B in the second prediction direction of the adjacent block B, the inter prediction control unit 114 adds the motion vector MvL0_B in the first prediction direction to the candidate predicted motion vector list for the second prediction direction. As such, when an adjacent block has no motion vector in the second prediction direction but instead has a motion vector in the first prediction direction, the inter prediction control unit 114 adds the motion vector in the first prediction direction of the adjacent block to the candidate predicted motion vector list for the second prediction direction.

Accordingly, it is possible to improve the coding efficiency. When the candidate predicted motion vector list for the second prediction direction has no motion vector of the adjacent block, the inter prediction control unit 114 does not allocate any predicted motion vector index. Accordingly, it is possible to improve the coding efficiency. Furthermore, the method of allocating the predicted motion vector index is not limited to this example. When no motion vector is present, the inter prediction control unit 114 may allocate the predicted motion vector index by adding a motion vector having the magnitude of 0 to the candidate predicted motion vector list.

FIG. 7 illustrates an example of a code table for variable-length-coding predicted motion vector indexes. As a predicted motion vector index is smaller, the code is shorter. The inter prediction control unit 114 allocates a smaller predicted motion vector index to a candidate estimated with higher prediction precision. Accordingly, it is possible to improve the coding efficiency.

In the example of the candidate predicted motion vector list for the second prediction direction in FIG. 6B, the inter prediction control unit 114 allocates the predicted motion vector index indicated by 2, to the motion vector MvL0_B in the first prediction direction of the adjacent block B. However, the inter prediction control unit 114 may allocate a smaller predicted motion vector index to a candidate in the same prediction direction.

More specifically, the inter prediction control unit 114 allocates 0 to a predicted motion vector index corresponding to Median (MvL1_A, MvL0_B, MvL1_C) in the candidate predicted motion vector list for the second prediction direction.

Furthermore, the inter prediction control unit 114 allocates 1 to a predicted motion vector index corresponding to the motion vector MvL1_A. Furthermore, the inter prediction control unit 114 allocates 2 to a predicted motion vector index corresponding to the motion vector MvL1_C. Furthermore, the inter prediction control unit 114 allocates 3 to a predicted motion vector index corresponding to the motion vector MvL0_B.

Accordingly, the same prediction direction is prioritized, and the smaller predicted motion vector indexes are allocated to the candidate predicted motion vectors estimated to have higher prediction precision.

Figure 8:
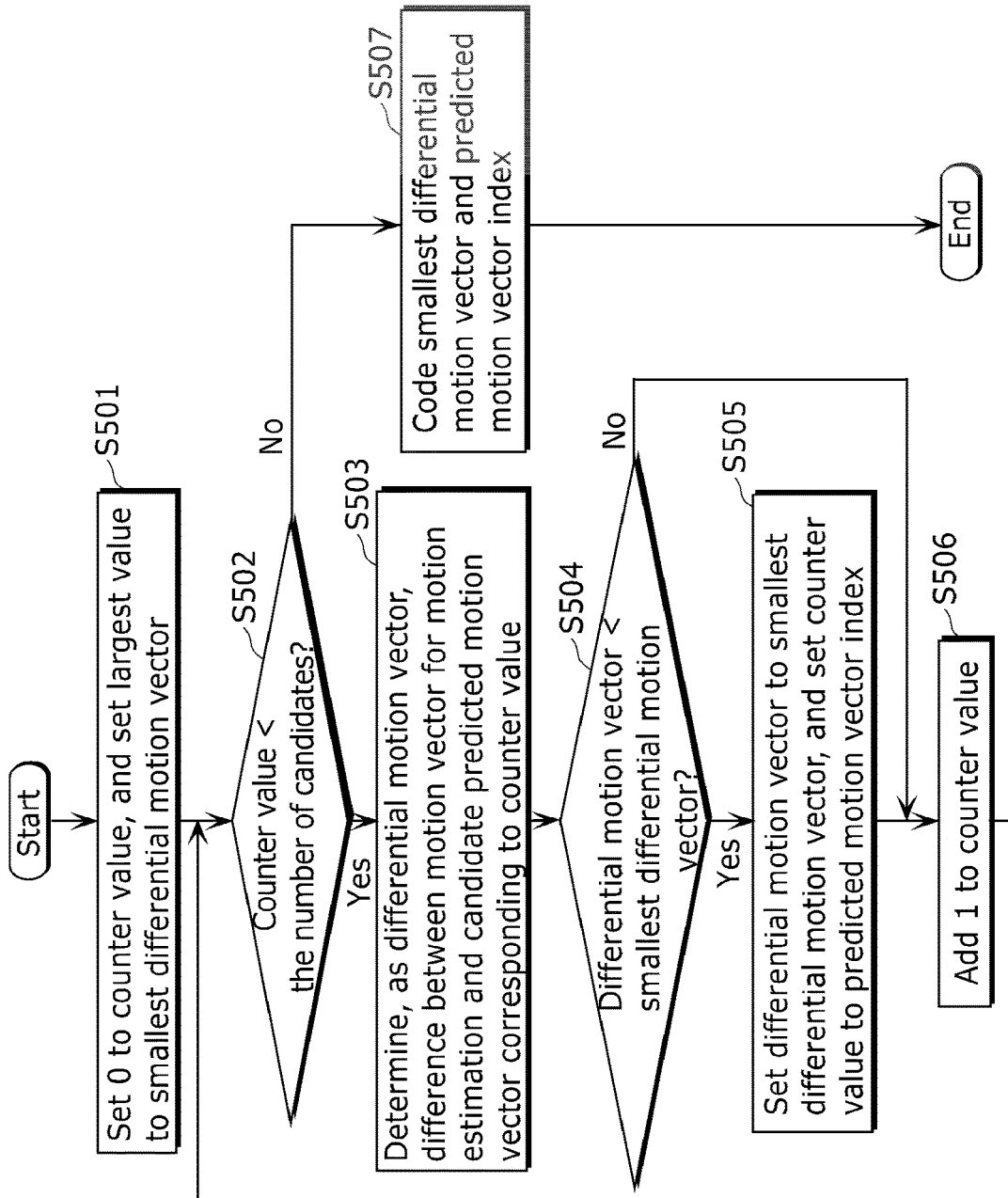
FIG. 8 illustrates processes for selecting a predicted motion vector according to Embodiment 1.

Next, a method of selecting a predicted motion vector (S107, S112, and S114) of FIG. 2 will be described in detail with reference to a procedure of processes in FIG. 8. The inter prediction control unit 114 sets 0 to a counter value for initialization, and sets the largest value to the smallest differential motion vector (S501).

Next, the inter prediction control unit 114 determines whether or not differential motion vectors of all the candidate predicted motion vectors are calculated (S502). When the candidate predicted motion vector still exists (Yes at S502), the inter prediction control unit 114 calculates the differential motion vector by subtracting the candidate predicted motion vector from a motion estimation result vector (S503).

Next, the inter prediction control unit 114 determines whether or not the calculated differential motion vector is smaller than the smallest differential motion vector (S504). When the differential motion vector is smaller than the smallest differential motion vector (Yes at S504), the inter prediction control unit 114 updates the smallest differential motion vector and the predicted motion vector index (S505).

Next, the inter prediction control unit 114 adds 1 to the counter value (S506). Then, the inter prediction control unit 114 determines again whether or not the next candidate predicted motion vector exists (S502). When the inter prediction control unit 114 determines that the differential motion vectors for all the candidate predicted motion vectors are calculated (No at S502), it transmits the smallest differential motion vector and the predicted motion vector index that are finally determined to the variable length coding unit 104, and causes the variable length coding unit 104 to code the smallest differential motion vector and the predicted motion vector index (S507).

According to Embodiment 1, when selecting a motion vector of an adjacent block as a candidate motion vector, the inter prediction control unit 114 adopts a new selection criterion for the selection. Accordingly, the inter prediction control unit 114 derives a predicted motion vector the most suitable for coding a motion vector of the current picture. Accordingly, it is possible to improve the coding efficiency.

In particular, there is a case where the reference picture indicated by the reference picture reference index of the second prediction direction of the current block is identical to the reference picture indicated by the reference picture reference index of the first prediction direction of the adjacent block. In such a case, the inter prediction control unit 114 adds the motion vector in the first prediction direction of the adjacent block as the candidate predicted motion vector in the second prediction direction of the current block. Thus, the efficient coding is possible.

In Embodiment 1, the inter prediction control unit 114 adds the motion vector in the first prediction direction of the adjacent block to the candidate predicted motion vector list for the second prediction direction of the current block. However, the inter prediction control unit 114 may add the motion vector in the second prediction direction of the adjacent block to the candidate predicted motion vector list for the first prediction direction of the current block.

Embodiment 2

Figure 9:
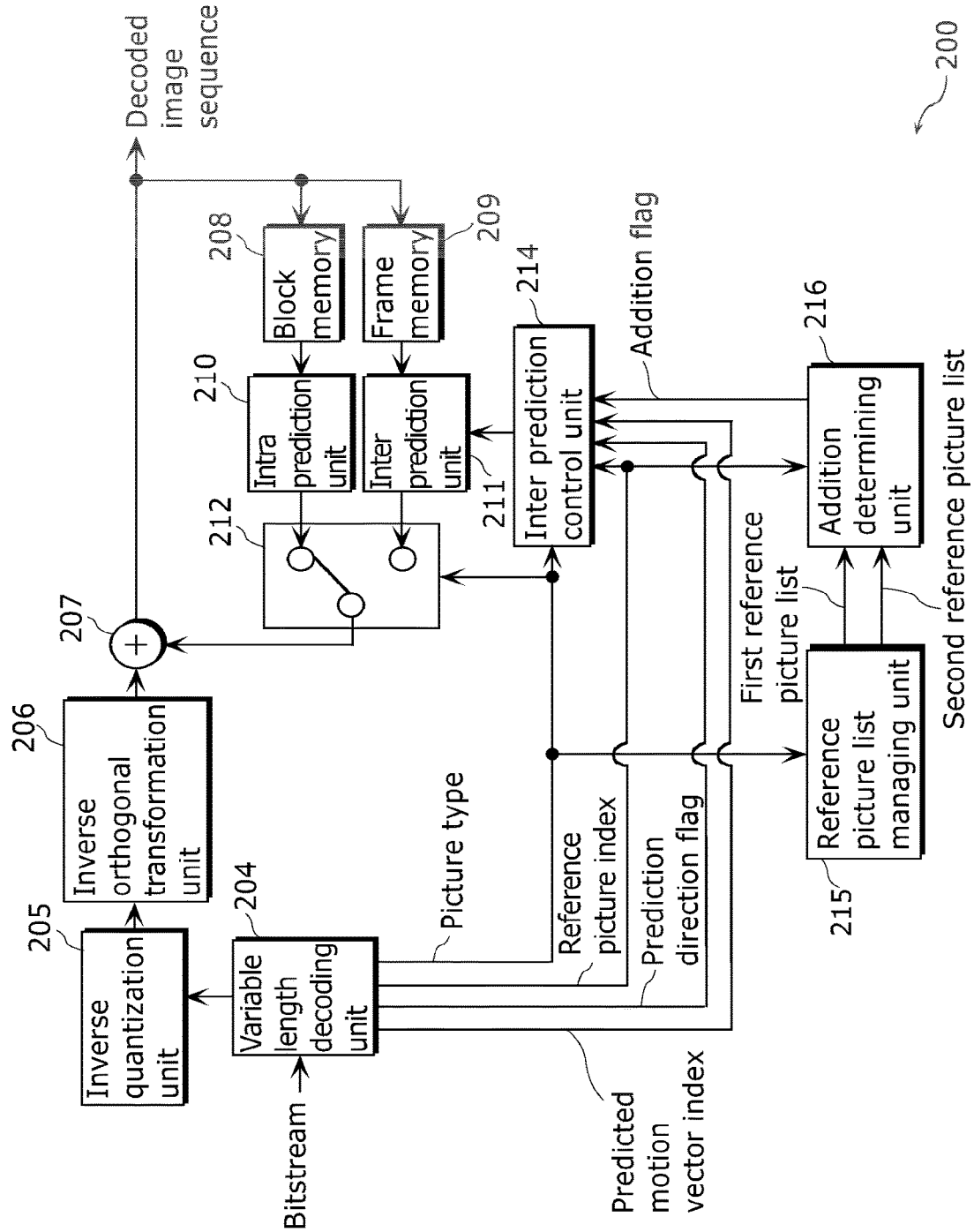
FIG. 9 illustrates a configuration of an image decoding apparatus according to Embodiment 2.

FIG. 9 is a block diagram illustrating a configuration of an image decoding apparatus according to Embodiment 2.

As illustrated in FIG. 9, an image decoding apparatus 200 includes a variable length decoding unit 204, an inverse quantization unit 205, an inverse orthogonal transformation unit 206, an addition unit 207, a block memory 208, a frame memory 209, an intra prediction unit 210, an inter prediction unit 211, a switch unit 212, an inter prediction control unit 214, a reference picture list managing unit 215, and an addition determining unit 216.

The variable length decoding unit 204 variable-length-decodes an input bitstream. Then, the variable length decoding unit 204 generates a picture type, a reference picture index, inter prediction direction information, a predicted motion vector index, and quantized coefficients. The inverse quantization unit 205 inversely quantizes the quantized coefficients. The inverse orthogonal transformation unit 206 performs transformation on the inversely quantized orthogonal transformation coefficients from the frequency domain to the image domain to generate prediction error image data.

The block memory 208 is a memory for storing an image sequence generated by adding the predicted image data to the prediction error image data, per block. The frame memory 209 is a memory for storing the image sequence per frame.

The intra prediction unit 210 generates the predicted image data of a block to be decoded through intra prediction, using the image sequence stored per block in the block memory 208.

The inter prediction unit 211 generates the predicted image data of the block to be decoded through inter prediction, using the image sequence stored per frame in the frame memory 209. The inter prediction control unit 214 controls a method of generating a motion vector and predicted image data in the inter prediction, according to the picture type, the reference picture index, the inter prediction direction information, and the predicted motion vector index.

Figure 33:
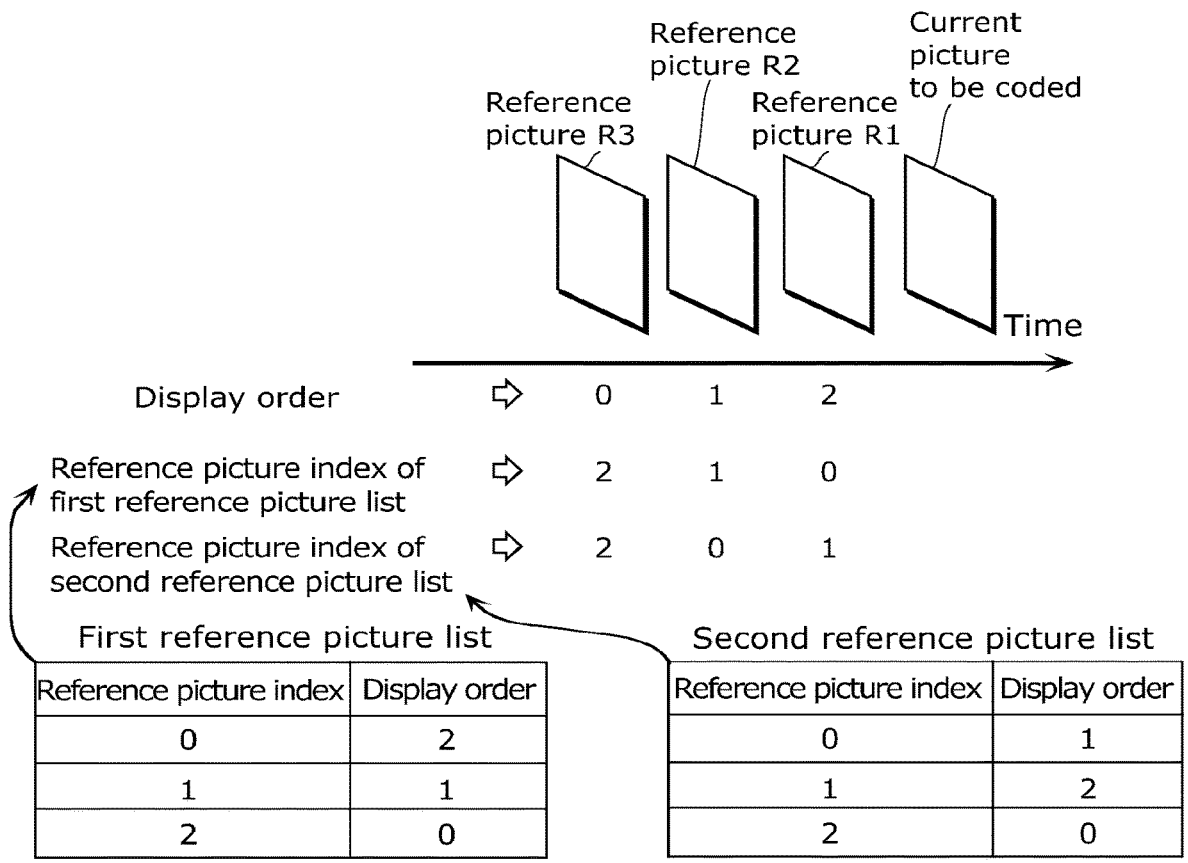
FIG. 33 illustrates an example of two reference picture lists.

The reference picture list managing unit 215 generates a reference list with the display orders of reference picture indexes for allocating the reference picture indexes to decoded reference pictures to be referred to in the inter prediction (similar to FIG. 33). The B-picture is used for coding with reference to two pictures. Thus, the reference picture list managing unit 215 holds two reference lists.

The reference picture list managing unit 215 manages the reference pictures by the reference picture indexes and the display orders in Embodiment 2. However, the reference picture list managing unit 215 may manage the reference pictures by the reference picture indexes and the coding orders (decoding orders).

The addition determining unit 216 determines whether or not a candidate predicted motion vector in the first prediction direction is added to a candidate predicted motion vector list for the second prediction direction of the block to be decoded with reference to the first and second reference picture lists generated by the reference picture list managing unit 215. Then, the addition determining unit 216 sets an addition flag. Since the procedure for determining the addition flag is the same as that in FIG. 5 according to Embodiment 1, the description thereof is omitted.

Finally, the addition unit 207 adds the decoded prediction error image data to the predicted image data to generate a decoded image sequence.

FIG. 10 is an outline procedure of processes of an image decoding method according to Embodiment 2. First, the inter prediction control unit 214 determines whether or not a decoded prediction direction is a bi-direction (S601).

When the decoded prediction direction is the bi-direction (Yes at S601), the inter prediction control unit 214 calculates candidate predicted motion vector lists for the first and second prediction directions (S602, S603). FIG. 4 according to Embodiment 1 is used for calculating the candidate predicted motion vector lists. The inter prediction control unit 214 decodes the reference picture indexes of the first and second prediction directions from a bitstream. The addition determining unit 216 determines whether or not a candidate predicted motion vector in the first prediction direction is added to the candidate predicted motion vector list for the second prediction direction (S604).

When the addition flag is turned ON, (Yes at S604), the inter prediction control unit 214 adds the candidate predicted motion vector in the first prediction direction to the candidate predicted motion vector list for the second prediction direction (S605). The addition flag indicating whether or not the candidate predicted motion vector in the first prediction direction is added is set in the same manner as FIG. 5 according to Embodiment 1.

The inter prediction control unit 214 selects the predicted motion vectors indicated by the predicted motion vector indexes of the first and second prediction directions that are decoded from the bitstream, from the candidate predicted motion vector lists for the first and second prediction directions. The inter prediction control unit 214 adds differential motion vectors in the first and second prediction directions that are decoded from the bitstream, to the predicted motion vectors in the first and second prediction directions.

Accordingly, the inter prediction control unit 214 decodes the motion vectors in the first and second prediction directions (S606).

When the decoded prediction direction is not the bi-direction (No at S601), that is, when the inter prediction direction is one direction, the inter prediction control unit 214 determines whether or not the prediction direction is the second prediction direction (S607).

When the prediction direction is the second prediction direction (Yes at S607), the inter prediction control unit 214 calculates a candidate predicted motion vector in the second prediction direction (S608). The addition determining unit 216 determines whether or not a candidate predicted motion vector in the first prediction direction is added to the candidate predicted motion vector list for the second prediction direction (S609).

When the addition flag is turned ON, (Yes at S609), the inter prediction control unit 214 adds the candidate predicted motion vector in the first prediction direction to the candidate predicted motion vector list for the second prediction direction (S610).

The inter prediction control unit 214 selects the predicted motion vector indicated by the predicted motion vector index of the second prediction direction that is decoded from the bitstream, from the candidate predicted motion vector list for the second prediction direction. The inter prediction control unit 214 adds the selected predicted motion vector to the differential motion vector in the second prediction direction that is decoded from the bitstream, thus decoding the motion vector in the second prediction direction (S611).

When the prediction direction is not the second prediction direction (No at S607), that is, when the prediction direction is the first prediction direction, the inter prediction control unit 214 calculates a candidate predicted motion vector in the first prediction direction (S612).

The inter prediction control unit 214 selects the predicted motion vector indicated by the predicted motion vector index of the first prediction direction that is decoded from the bitstream, from the candidate predicted motion vector list for the first prediction direction. Then, the inter prediction control unit 214 adds the selected predicted motion vector to the differential motion vector in the first prediction direction that is decoded from the bitstream, thus decoding the motion vector in the first prediction direction (S613).

According to Embodiment 2, when selecting a motion vector of an adjacent block as a candidate motion vector, the inter prediction control unit 214 adopts a new selection criterion for the selection. Accordingly, a predicted motion vector the most suitable for decoding a motion vector is derived. Furthermore, the coding efficiency will be improved.

In particular, there is a case where the reference picture indicated by the reference picture reference index of the second prediction direction of the current block to be decoded is identical to the reference picture indicated by the reference picture reference index of the first prediction direction of the adjacent block. In such a case, the inter prediction control unit 214 adds the motion vector in the first prediction direction of the adjacent block as a candidate predicted motion vector in the second prediction direction of the current block to be decoded. Accordingly, the coding efficiency will be improved.

The inter prediction control unit 214 according to Embodiment 2 adds the motion vector in the first prediction direction of the adjacent block to the candidate predicted motion vector list for the second prediction direction of the current block. However, the inter prediction control unit 214 may add the motion vector in the second prediction direction of the adjacent block to the candidate predicted motion vector list for the first prediction direction of the current block.

Embodiment 3

Embodiment 3 supplementarily describes an image coding apparatus including the characteristic constituent elements of the image coding apparatus 100 according to Embodiment 1.

Figure 11A:
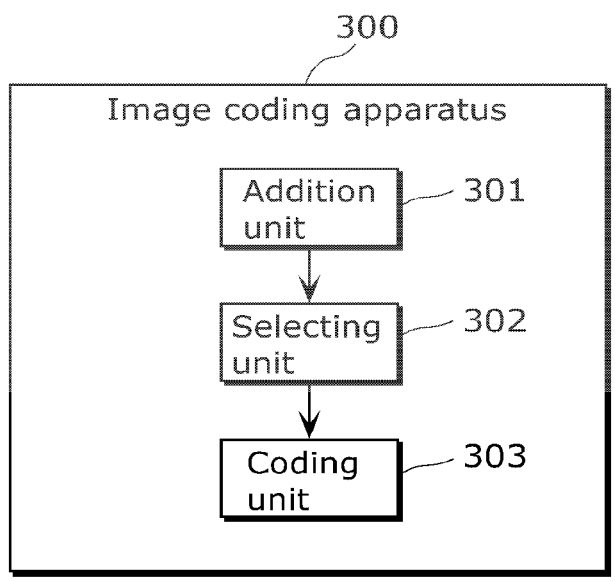
FIG. 11A illustrates a configuration of an image coding apparatus according to Embodiment 3.

FIG. 11A illustrates a configuration of the image coding apparatus according to Embodiment 3. An image coding apparatus 300 in FIG. 11A includes an addition unit 301, a selecting unit 302, and a coding unit 303. The addition unit 301 mainly corresponds to the addition determining unit 116 according to Embodiment 1. The selecting unit 302 mainly corresponds to the inter prediction control unit 114 according to Embodiment 1. The coding unit 303 mainly corresponds to the variable length coding unit 104 according to Embodiment 1.

Then, the image coding apparatus 300 codes the current picture per block. Here, the image coding apparatus 300 performs prediction using one or both of the first and second reference picture lists. In other words, the image coding apparatus 300 performs prediction using one or both of the reference picture indicated by the first reference picture list and the reference picture indicated by the second reference picture list.

Figure 11B:
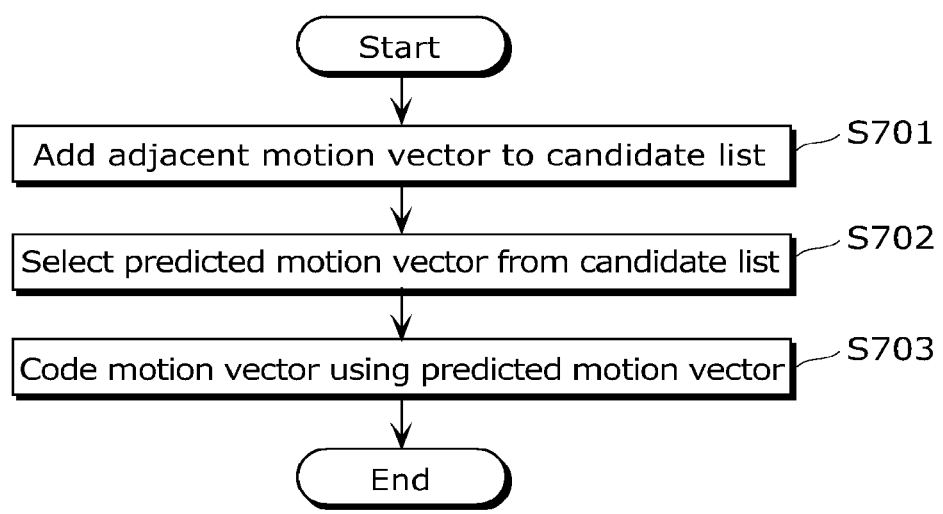
FIG. 11B illustrates a flowchart of operations performed by the image coding apparatus according to Embodiment 3.

FIG. 11B is a flowchart of operations performed by the image coding apparatus 300 in FIG. 11A. First, the addition unit 301 adds the first adjacent motion vector to a candidate predicted motion vector list to be used for coding the current motion vector, as a candidate for a predicted motion vector (S701).

The first adjacent motion vector is a motion vector of an adjacent block that is adjacent to the current block to be coded included in the current picture to be coded. Furthermore, the first adjacent motion vector indicates a position in a first reference picture included in the first reference picture list. The current motion vector is a motion vector of the current block. Furthermore, the current adjacent motion vector indicates a position in a second reference picture included in the second reference picture list.

Next, the selecting unit 302 selects a predicted motion vector to be used for coding the current motion vector, from a candidate list including the first adjacent motion vector (S702). Next, the coding unit 303 codes the current motion vector using the selected predicted motion vector (S703).

Accordingly, the adjacent motion vector corresponding to the first reference picture list is added to the candidate list corresponding to the second reference picture list. Accordingly, the number of the options of predicted motion vectors increases. Accordingly, it is possible to derive a predicted motion vector suitable for improving the coding efficiency of the current motion vector.

Furthermore, the addition unit 301 may add the second adjacent motion vector to the candidate list. The second adjacent motion vector is a motion vector of an adjacent block, and indicates a position in a third reference picture included in the second reference picture list.

Accordingly, the adjacent motion vector corresponding to the second reference picture list is added to the candidate list corresponding to the second reference picture list. Accordingly, the number of the options of predicted motion vectors increases. Accordingly, it is possible to derive a predicted motion vector suitable for improving the coding efficiency of the current motion vector.

Furthermore, the addition unit 301 may determine whether or not the second reference picture is identical to the third reference picture. When determining that the second reference picture is identical to the third reference picture, the addition unit 301 may add the second adjacent motion vector to the candidate list. Furthermore, the addition unit 301 may determine whether or not the second reference picture is identical to the first reference picture. Then, when determining that the second reference picture is identical to the first reference picture, the addition unit 301 may add the first adjacent motion vector to the candidate list.

Accordingly, only when the reference picture corresponding to the current motion vector is identical to the reference picture corresponding to the adjacent motion vector, the adjacent motion vector is added to the candidate list. Thus, only when the adjacent motion vector is appropriate as a candidate for a predicted motion vector, the adjacent motion vector is added to the candidate list. Thus, an appropriate predicted motion vector is derived.

Furthermore, the addition unit 301 may determine whether or not the second reference picture is identical to the first reference picture when determining that the second reference picture is not identical to the third reference picture. When determining that the second reference picture is not identical to the third reference picture and that the second reference picture is identical to the first reference picture, the addition unit 301 may add the first adjacent motion vector to the candidate list.

Accordingly, when the current motion vector corresponds to the second reference picture list, the adjacent motion vector corresponding to the second reference picture list is preferentially added to the candidate list. Thus, a more appropriate adjacent motion vector is added to the candidate list as a candidate for a predicted motion vector.

Furthermore, the addition unit 301 may determine whether or not the second reference picture is identical to the third reference picture by determining whether or not the display order of the second reference picture is identical to the display order of the third reference picture. Furthermore, the addition unit 301 may determine whether or not the second reference picture is identical to the first reference picture by determining whether or not the display order of the second reference picture is identical to the display order of the first reference picture.

Here, the first reference picture is identified by the first reference picture list and the first reference index. Furthermore, the second reference picture is identified by the second reference picture list and the second reference index. Furthermore, the third reference picture is identified by the second reference picture list and the third reference index.

Accordingly, whether or not the reference picture identified by the first reference picture list is identical to the reference picture identified by the second reference picture list is appropriately determined based on the display orders.

Furthermore, when determining that the second reference picture is not identical to the third reference picture and that the second reference picture is not identical to the first reference picture, the addition unit 301 may add 0 to the candidate list. In other words, the addition unit 301 may add a motion vector having a magnitude of 0 to the candidate list as a candidate for a predicted motion vector.

Accordingly, decrease in the number of candidates is suppressed. Thus, a state where no candidate exists in the candidate list is avoided.

Furthermore, the addition unit 301 may add, to the candidate list, index values and candidates for a predicted motion vector so that the index values are in one-to-one correspondence with the candidates for the predicted motion vector. Furthermore, the selecting unit 302 may select an index value from the candidate list as a predicted motion vector. The coding unit 303 may further code the selected index value so that the code of the index value is longer as the index value is larger.

Accordingly, the selected predicted motion vector is appropriately coded. Thus, the coder and the decoder select the same predicted motion vector.

Furthermore, the addition unit 301 may add the first adjacent motion vector of an adjacent block to the candidate list, assuming that each of a left adjacent block, an above-adjacent block, and an upper right adjacent block with respect to the current block to be coded is the adjacent block.

Accordingly, a plurality of adjacent motion vectors is added to the candidate list as candidates for the predicted motion vector. Accordingly, the number of the options of predicted motion vectors increases.

Embodiment 4

Embodiment 4 supplementarily describes an image decoding apparatus including the characteristic constituent elements of the image decoding apparatus 200 according to Embodiment 2.

Figure 12A:
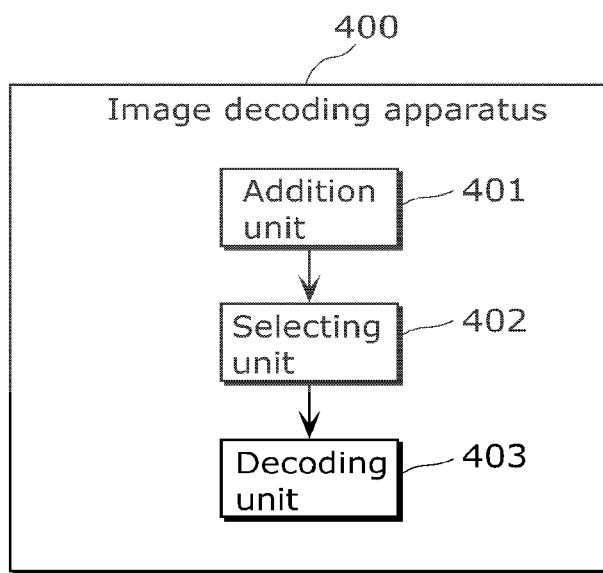
FIG. 12A illustrates a configuration of an image decoding apparatus according to Embodiment 4.

FIG. 12A illustrates a configuration of the image decoding apparatus according to Embodiment 4. An image decoding apparatus 400 in FIG. 12A includes an addition unit 401, a selecting unit 402, and a decoding unit 403. The addition unit 402 mainly corresponds to the addition determining unit 216 according to Embodiment 2. The selecting unit 402 mainly corresponds to the inter prediction control unit 214 according to Embodiment 2. The decoding unit 403 mainly corresponds to the variable length decoding unit 204 and the inter prediction control unit 214 according to Embodiment 2.

The image decoding apparatus 400 decodes the current picture per block. Here, the image decoding apparatus 400 performs prediction using one or both of the first and second reference picture lists. In other words, the image decoding apparatus 400 performs prediction using one or both of the reference picture indicated by the first reference picture list and the reference picture indicated by the second reference picture list.

Figure 12B:
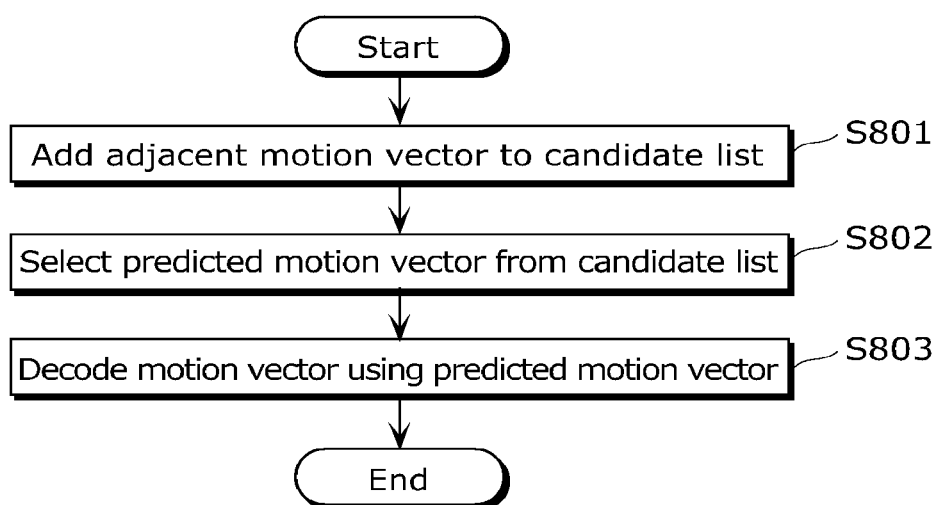
FIG. 12B illustrates a flowchart of operations performed by the image decoding apparatus according to Embodiment 4.

FIG. 12B is a flowchart of operations performed by the image decoding apparatus 400 in FIG. 12A. First, the addition unit 401 adds the first adjacent motion vector to a candidate predicted motion vector list to be used for decoding the current motion vector, as a candidate for a predicted motion vector (S801).

The first adjacent motion vector is a motion vector of an adjacent block that is adjacent to the current block to be decoded included in the current picture to be decoded. Furthermore, the first adjacent motion vector indicates a position in a first reference picture included in the first reference picture list. The current motion vector is a motion vector of the current block to be decoded. Furthermore, the current motion vector indicates a position in a second reference picture included in the second reference picture list.

Next, the selecting unit 402 selects a predicted motion vector to be used for decoding the current motion vector, from a candidate list including the first adjacent motion vector (S802). Next, the decoding unit 403 decodes the current motion vector using the selected predicted motion vector (S803).

Accordingly, the adjacent motion vector corresponding to the first reference picture list is added to the candidate list corresponding to the second reference picture list. Furthermore, the number of the options of predicted motion vectors increases. Thus, it is possible to derive a predicted motion vector suitable for improving the coding efficiency of the current motion vector.

Furthermore, the addition unit 401 may add the second adjacent motion vector to the candidate list. The second adjacent motion vector is a motion vector of an adjacent block, and indicates a position in a third reference picture included in the second reference picture list.

Accordingly, the adjacent motion vector corresponding to the second reference picture list is added to the candidate list corresponding to the second reference picture list. Furthermore, the number of the options of predicted motion vectors increases. Thus, it is possible to derive a predicted motion vector suitable for improving the coding efficiency of the current motion vector.

Furthermore, the addition unit 401 may determine whether or not the second reference picture is identical to the third reference picture. Then, when determining that the second reference picture is identical to the third reference picture, the addition unit 401 may add the second adjacent motion vector to the candidate list. Furthermore, the addition unit 401 may determine whether or not the second reference picture is identical to the first reference picture. Then, when determining that the second reference picture is identical to the first reference picture, the addition unit 401 may add the first adjacent motion vector to the candidate list.

Accordingly, only when the reference picture corresponding to the current motion vector is identical to the reference picture corresponding to the adjacent motion vector, the adjacent motion vector is added to the candidate list. Thus, only when the adjacent motion vector is appropriate as a candidate for a predicted motion vector, the adjacent motion vector is added to the candidate list. Thus, an appropriate predicted motion vector is derived.

Furthermore, the addition unit 401 may determine whether or not the second reference picture is identical to the first reference picture when determining that the second reference picture is not identical to the third reference picture. When determining that the second reference picture is not identical to the third reference picture and that the second reference picture is identical to the first reference picture, the addition unit 401 may add the first adjacent motion vector to the candidate list.

Accordingly, when the current motion vector corresponds to the second reference picture list, the adjacent motion vector corresponding to the second reference picture list is preferentially added to the candidate list. Thus, a more appropriate adjacent motion vector is added to the candidate list as a candidate for a predicted motion vector.

Furthermore, the addition unit 401 may determine whether or not the second reference picture is identical to the third reference picture by determining whether or not the display order of the second reference picture is identical to the display order of the third reference picture. Furthermore, the addition unit 301 may determine whether or not the second reference picture is identical to the first reference picture by determining whether or not the display order of the second reference picture is identical to the display order of the first reference picture.

Here, the first reference picture is identified by the first reference picture list and the first reference index. Furthermore, the second reference picture is identified by the second reference picture list and the second reference index. Furthermore, the third reference picture is identified by the second reference picture list and the third reference index.

Accordingly, whether or not the reference picture identified by the first reference picture list is identical to the reference picture identified by the second reference picture list is appropriately determined based on the display orders.

Furthermore, when determining that the second reference picture is not identical to the third reference picture and that the second reference picture is not identical to the first reference picture, the addition unit 401 may add 0 to the candidate list. In other words, the addition unit 401 may add a motion vector having a magnitude of 0 to the candidate list as a candidate for a predicted motion vector.

Accordingly, decrease in the number of candidates is suppressed. Thus, a state where no candidate exists in the candidate list is avoided.

Furthermore, the addition unit 401 may add index values and candidates for a predicted motion vector to the candidate list so that the index values are in one-to-one correspondence with the candidates for the predicted motion vector. The decoding unit 403 may decode the index value coded so that the code is longer as the index value is larger. Furthermore, the selecting unit 402 may select a predicted motion vector corresponding to the decoded index value, from the candidate list.

Accordingly, the selected predicted motion vector is appropriately decoded. Thus, the coder and the decoder select the same predicted motion vector.

Furthermore, the addition unit 401 may add the first adjacent motion vector of the adjacent block to the candidate list, assuming that each of a left adjacent block, an above-adjacent block, and an upper right adjacent block with respect to the current block to be decoded is the adjacent block.

Accordingly, a plurality of adjacent motion vectors is added to the candidate list as candidates for the predicted motion vector. Thus, the number of the options of predicted motion vectors increases.

Embodiment 5

Embodiment 5 supplementarily describes an image coding and decoding apparatus including the characteristic constituent elements of the image coding apparatus 100 according to Embodiment 1 and the image decoding apparatus 200 according to Embodiment 2.

Figure 13:
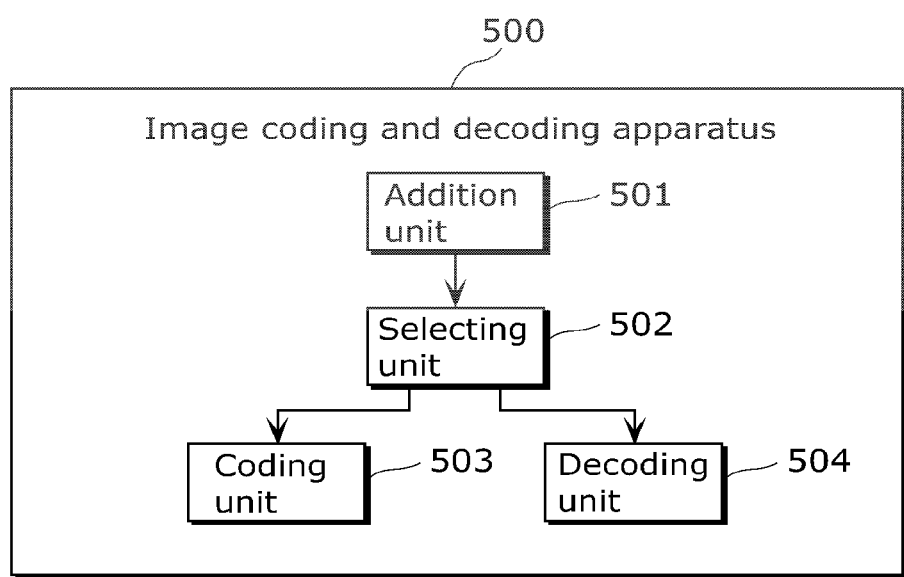
FIG. 13 illustrates a configuration of an image coding and decoding apparatus according to Embodiment 5.

FIG. 13 illustrates a configuration of the image coding and decoding apparatus according to Embodiment 5. An image coding and decoding apparatus 500 in FIG. 13 includes an addition unit 501, a selecting unit 502, a coding unit 503, and a decoding unit 504.

The addition unit 501 mainly corresponds to the addition determining unit 116 according to Embodiment 1 and the addition determining unit 216 according to Embodiment 2. The selecting unit 402 mainly corresponds to the inter prediction control unit 114 according to Embodiment 1 and the inter prediction control unit 214 according to Embodiment 2. The coding unit 503 mainly corresponds to the variable length coding unit 104 according to Embodiment 1. The decoding unit 504 mainly corresponds to the variable length decoding unit 204 and the inter prediction control unit 214 according to Embodiment 2.

Then, the image coding and decoding apparatus 500 codes the current picture per block, and decodes the current picture per block. Here, the image coding and decoding apparatus 500 performs prediction using one or both of the first and second reference picture lists. In other words, the image coding and decoding apparatus 500 performs prediction using one or both of the reference picture indicated by the first reference picture list and the reference picture indicated by the second reference picture list.

The addition unit 501 adds the first adjacent motion vector to a candidate predicted motion vector list to be used for coding or decoding the current motion vector, as a candidate predicted motion vector.

The first adjacent motion vector is a motion vector of an adjacent block that is adjacent to a block to be processed included in the current picture to be coded or decoded. Furthermore, the first adjacent motion vector indicates a position in a first reference picture included in the first reference picture list. The current motion vector is a motion vector of the block to be processed. Furthermore, the current motion vector indicates a position in a second reference picture included in the second reference picture list.

The selecting unit 502 selects a predicted motion vector to be used for coding or decoding the current motion vector, from a candidate list including the first adjacent motion vector. The coding unit 503 codes the current motion vector using the selected predicted motion vector. The decoding unit 504 decodes the current motion vector using the selected predicted motion vector.

Accordingly, the image coding and decoding apparatus 500 implements both of the functions of the image coding apparatus and the image decoding apparatus.

Although the image coding apparatus and the image decoding apparatus according to the present invention are described based on Embodiments, the present invention is not limited to these Embodiments. The present invention includes modifications conceived by a person skilled in the art using Embodiments, and other embodiments arbitrarily combining the constituent elements included in Embodiments.

For example, processes performed by a particular processing unit may be performed by another processing unit. Furthermore, the order of performing the processes may be changed, and a plurality of processes may be executed in parallel.

Furthermore, the present invention may be implemented not only as an image coding apparatus and an image decoding apparatus but also as a method using, as steps, the processes performed by the processing units included in the image coding apparatus and the image decoding apparatus. For example, such steps are executed by a computer. Furthermore, the present invention can be implemented for causing a computer to execute the steps included in the method as a program. Furthermore, the present invention can be implemented as a computer-readable recording medium, such as a CD-ROM that records the program.

Accordingly, the image coding apparatus and the image decoding apparatus are implemented as an image coding and decoding apparatus by combining the constituent elements of the image coding apparatus and the image decoding apparatus.

Furthermore, each of the constituent elements included in the image coding apparatus and the image decoding apparatus may be implemented as a Large Scale Integration (LSI). The constituent elements may be made into one chip or a plurality of chips so as to include all or a part of the constituent elements. For example, the constituent elements other than a memory may be integrated into a single chip. The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. It is also acceptable to use a Field Programmable Gate Array (FPGA) that is programmable, and a reconfigurable processor in which connections and settings of circuit cells within the LSI are reconfigurable.

In the future, with advancement in semiconductor technology, a brand-new technology may replace LSI. The constituent elements included in the image coding apparatus and the image decoding apparatus can be integrated into a circuit using such a technology.

Embodiment 6

The processing described in each of Embodiments can be simply implemented by recording, onto a recording medium, a program for implementing the moving picture coding method (image coding method) or the moving picture decoding method (image decoding method) described in each of Embodiments. The recording medium may be any recording medium as long as the program can be recorded thereon, such as a magnetic disk, an optical disc, a magnetic optical disc, an IC card, and a semiconductor memory.

Hereinafter, the applications to the moving picture coding method (image coding method) and the moving picture decoding method (image decoding method) described in each of Embodiments and systems using thereof will be described. The system is characterized by including an image coding and decoding apparatus including an image coding apparatus using an image coding method and an image decoding apparatus using an image decoding method. Other configuration in the system can be appropriately changed according to each individual case.

Figure 14:
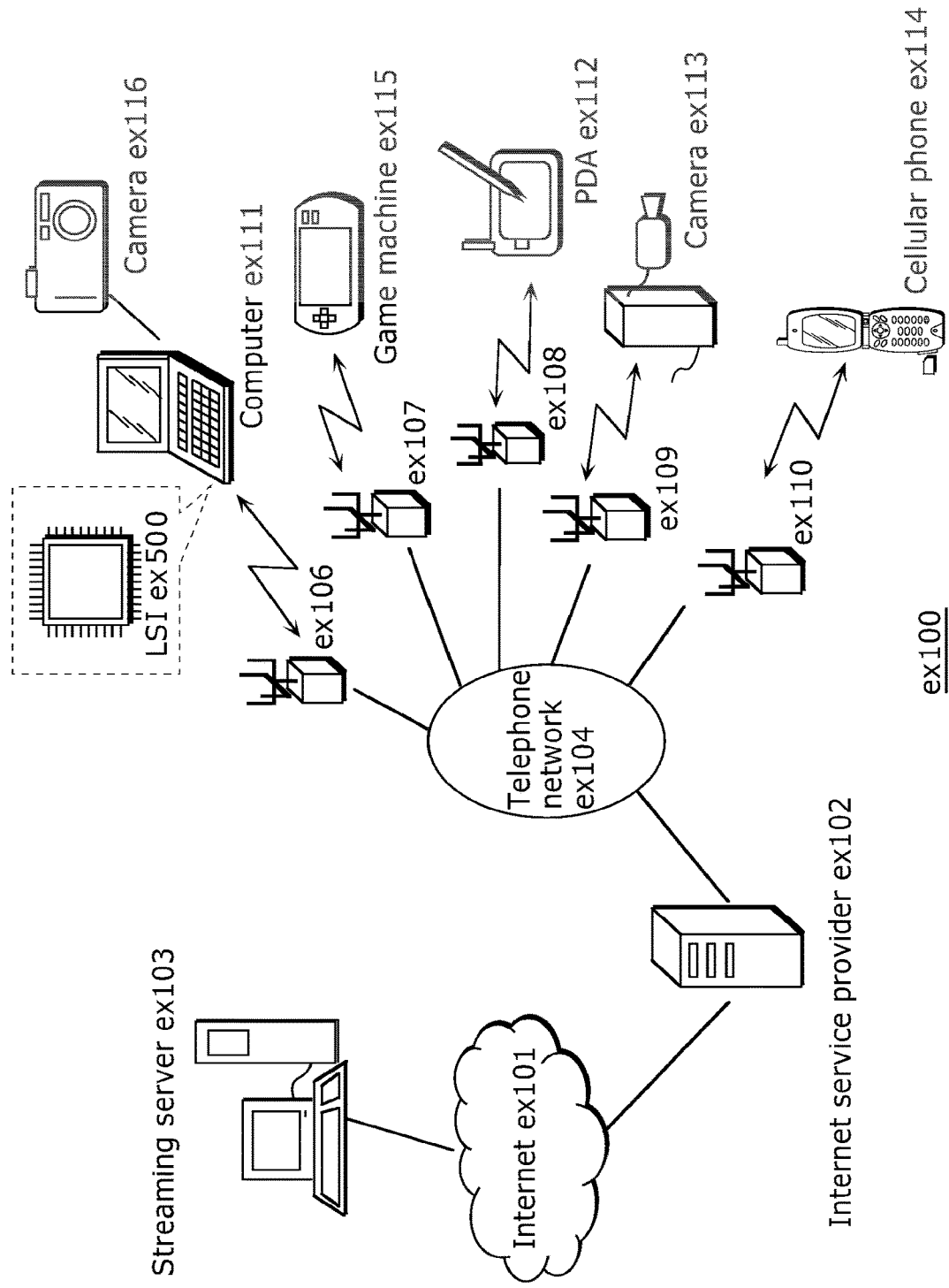
FIG. 14 illustrates an overall configuration of a content providing system for implementing content distribution services.

FIG. 14 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110.

However, the configuration of the content providing system ex100 is not limited to the configuration shown in FIG. 14, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in each of Embodiments, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (that is, functions as an image decoding apparatus according to the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving picture data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 15:
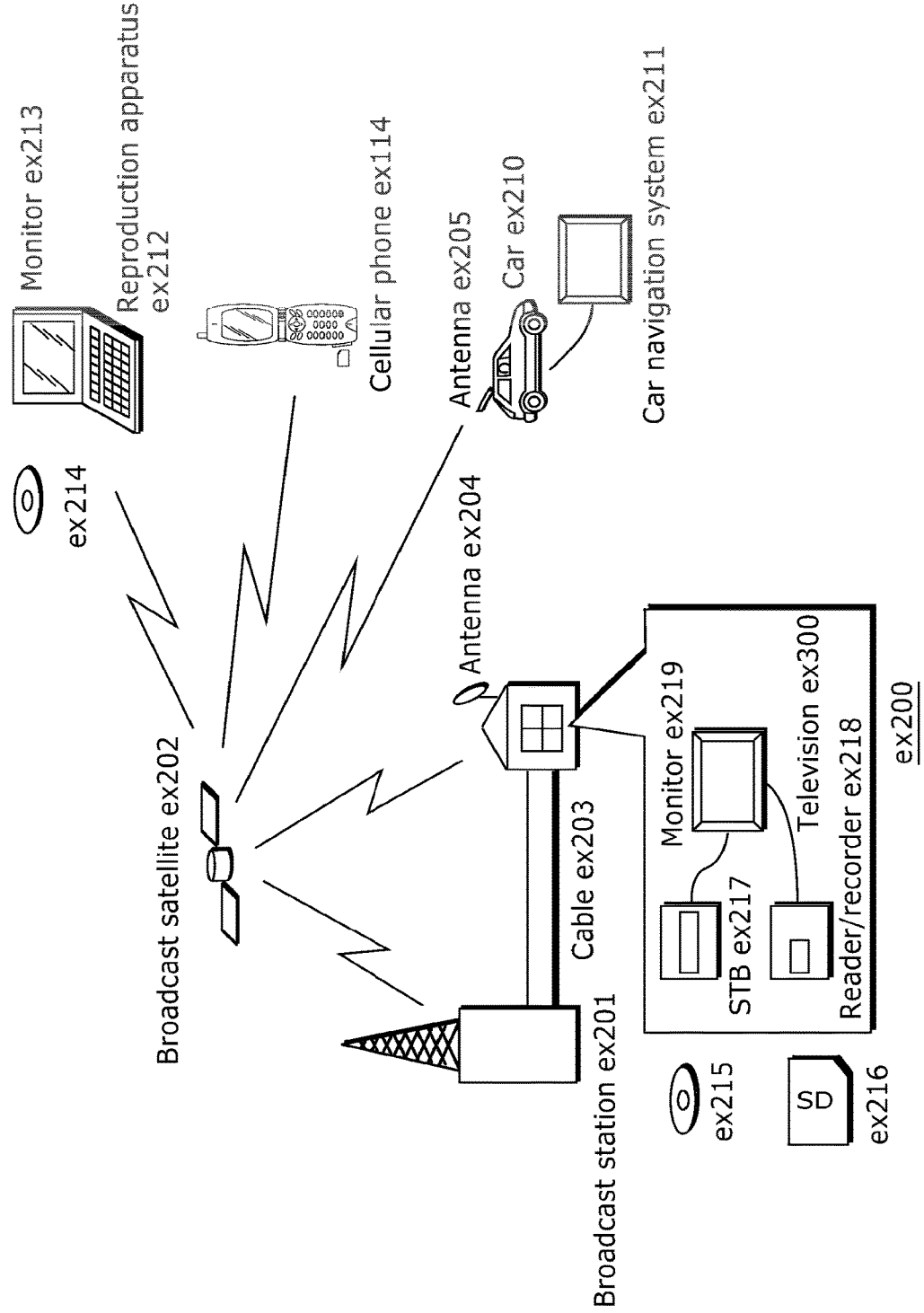
FIG. 15 illustrates an overall configuration of a digital broadcasting system.

Aside from the example of the content providing system ex100, at least one of the moving picture coding apparatus (image coding apparatus) and the moving picture decoding apparatus (image decoding apparatus) described in each of Embodiments may be implemented in a digital broadcasting system ex200 illustrated in FIG. 15. More specifically, a broadcast station ex201 communicates or transmits, via radio waves to a broadcast satellite ex202, multiplexed data obtained by multiplexing audio data and others onto video data. The video data is data coded by the moving picture coding method described in each of Embodiments (that is, data coded by the image coding apparatus according to the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data and reproduces the decoded data (that is, functions as the image decoding apparatus according to the present invention).

Furthermore, a reader/recorder ex218 that (i) reads and decodes the multiplexed data recorded on a recording media ex215, such as a DVD and a BD, or (ii) codes video signals in the recording medium ex215, and in some cases, writes data obtained by multiplexing an audio signal on the coded data can include the moving picture decoding apparatus or the moving picture coding apparatus as shown in each of Embodiments. In this case, the reproduced video signals are displayed on the monitor ex219, and can be reproduced by another device or system using the recording medium ex215 on which the multiplexed data is recorded. Furthermore, it is also possible to implement the image decoding apparatus in the set top box ex217 connected to the cable ex203 for a cable television or the antenna ex204 for satellite and/or terrestrial broadcasting, so as to display the video signals on the monitor ex219 of the television ex300. The moving picture decoding apparatus may be included not in the set top box but in the television ex300.

Figure 16:
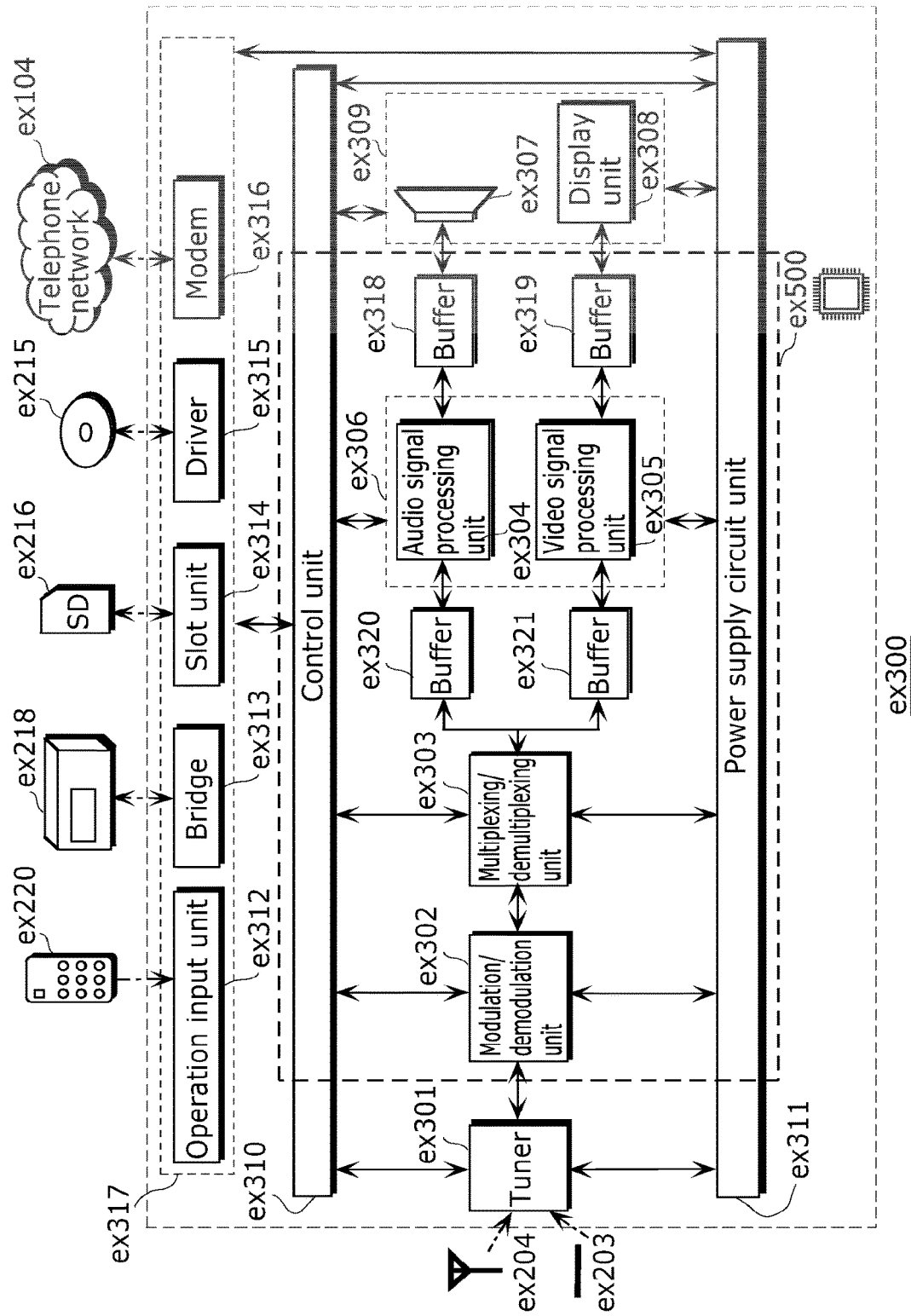
FIG. 16 illustrates a block diagram illustrating an example of a configuration of a television.

FIG. 16 illustrates the television (receiver) ex300 that uses the moving picture coding method and the moving picture decoding method described in each of Embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 (functioning as the image coding apparatus or the image decoding apparatus according to the present invention) that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to one another through a synchronous bus.

First, a configuration in which the television ex300 decodes data obtained from outside through the antenna ex204 and others and reproduces the decoded data will be described. In the television ex300, upon a user operation from a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments in the television ex300. The output unit ex309 provides the decoded video signal and audio signal outside. When the output unit ex309 provides the video signal and the audio signal, the signals may be temporarily stored in buffers ex318 and ex319, and others so that the signals are reproduced in synchronization with each other. Furthermore, the television ex300 may read a coded bitstream not through a broadcast and others but from the recording media ex215 and ex216, such as a magnetic disk, an optical disc, and an SD card. Next, a configuration in which the television ex300 codes an audio signal and a video signal, and transmits the data outside or writes the data on a recording medium will be described. In the television ex300, upon a user operation from the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of performing all the processes but capable of only one of receiving, decoding, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 17:
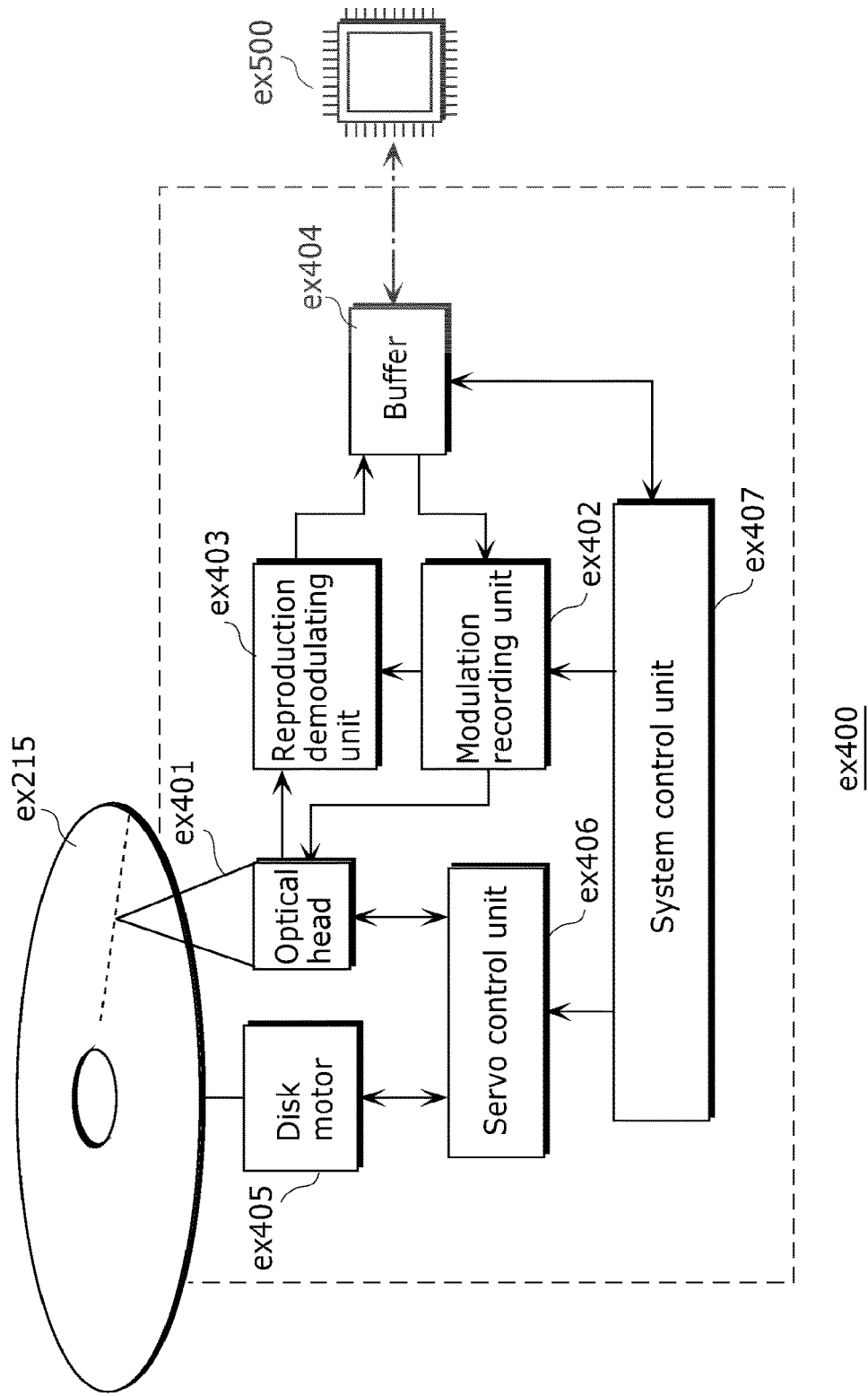
FIG. 17 illustrates a block diagram illustrating an example of a configuration of an information reproducing/recording unit that reads and writes information from or on a recording medium that is an optical disc.

As an example, FIG. 17 illustrates a configuration of an information reproducing/recording unit ex400 when data is read or written from or in an optical disc. The information reproducing/recording unit ex400 includes constituent elements ex401, ex402, ex403, ex404, ex405, ex406, and ex407 to be described hereinafter. The optical head ex401 irradiates a laser spot on a recording surface of the recording medium ex215 that is an optical disc to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 18:
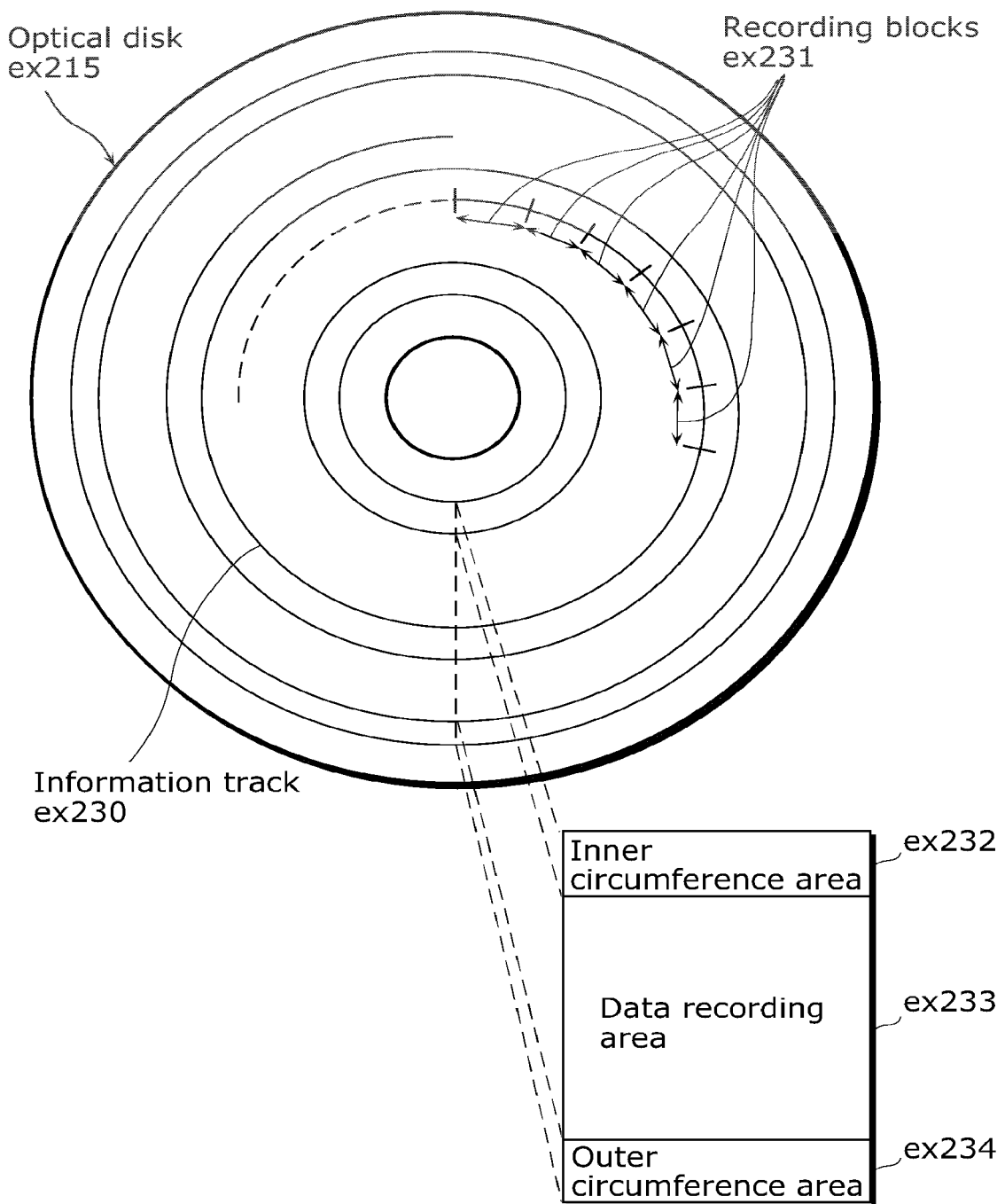
FIG. 18 illustrates an example of a configuration of a recording 3o medium that is an optical disc.

FIG. 18 schematically illustrates the recording medium ex215 that is the optical disc. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit ex400 reads and writes coded audio data, coded video data, or coded data obtained by multiplexing the coded audio data and the coded video data, from and on the data recording area ex233 of the recording medium ex215.

Although an optical disc having a layer, such as a DVD and a BD is described as an example in the description, the optical disc is not limited to such, and may be an optical disc having a multilayer structure and capable of being recorded on a part other than the surface. Furthermore, the optical disc may have a structure for multidimensional recording/reproduction, such as recording of information using light of colors with different wavelengths in the same portion of the optical disc and recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be the one for example, including a GPS receiving unit in the configuration illustrated in FIG. 16. The same will be true for the configuration of the computer ex111, the cellular phone ex114, and others.

Figure 19A:
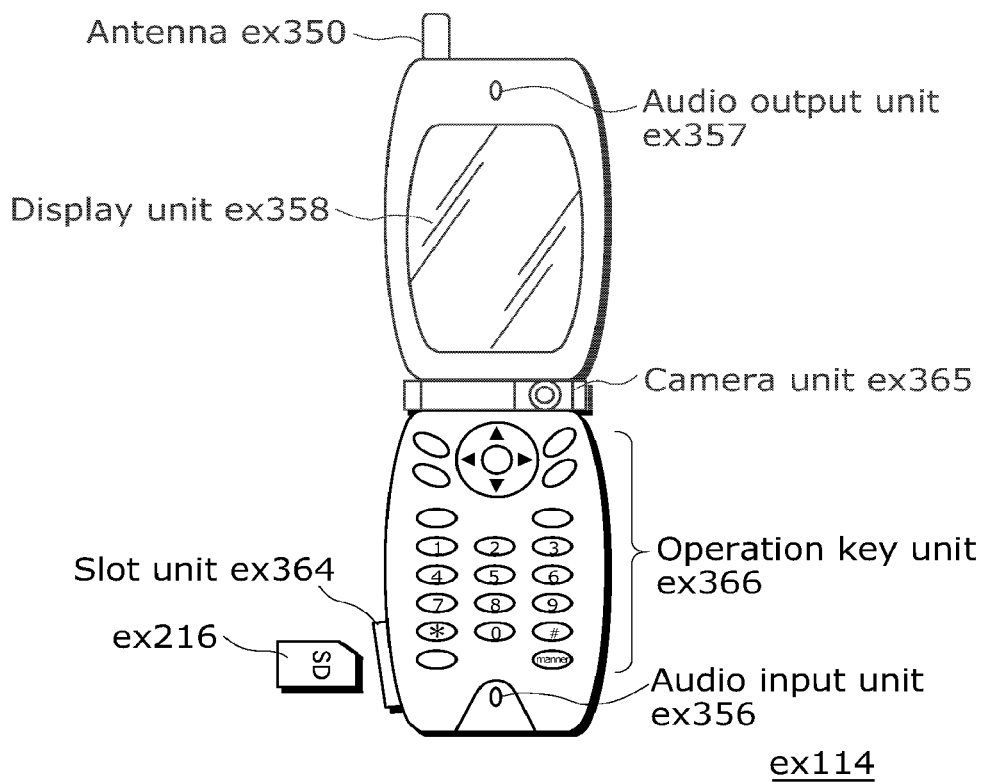
FIG. 19A illustrates an example of a cellular phone.

FIG. 19A illustrates the cellular phone ex114 that uses the moving picture coding method and the moving picture decoding method described in Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including a set of operation keys ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 19B:
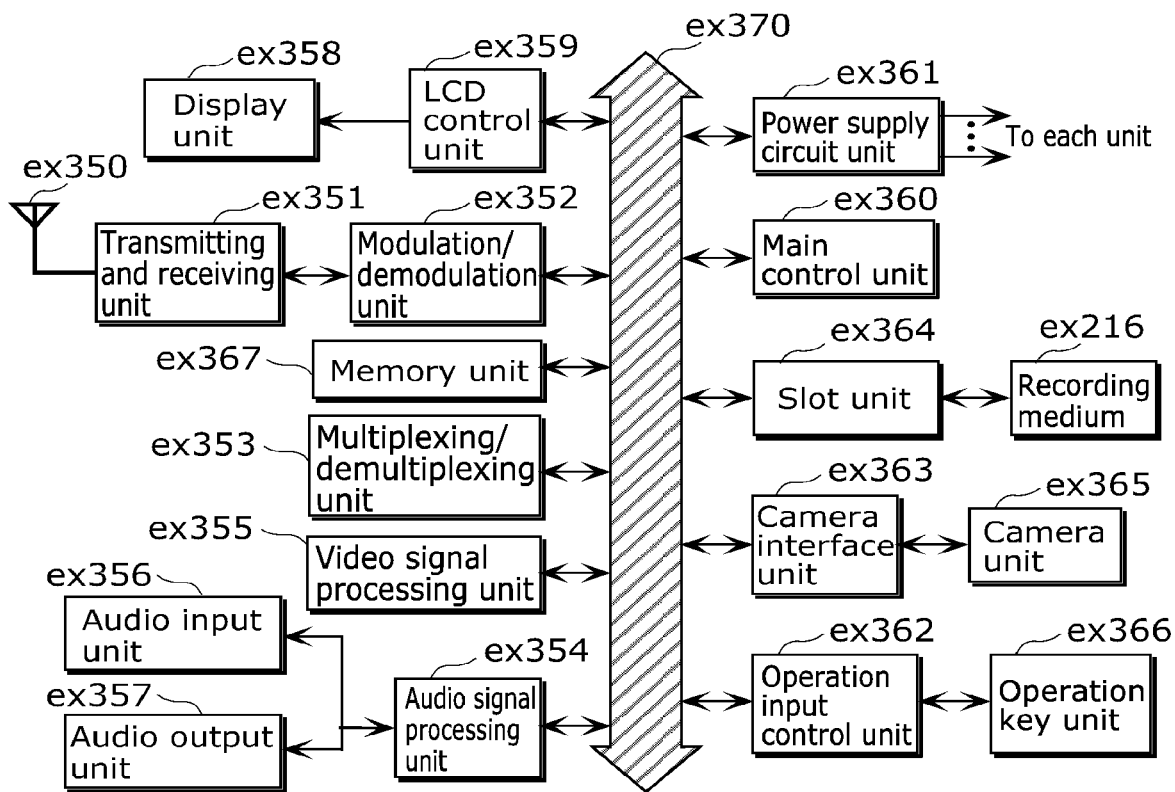
FIG. 19B illustrates an example of a configuration of the cellular phone.

Next, an example of a configuration of the cellular phone ex114 will be described with reference to FIG. 19B. In the cellular phone ex114, a main control unit ex360 designed to control overall each unit of the main body including the display unit ex358 as well as the operation keys ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key and a power key are turned ON by a user's operation, the power supply circuit unit ex360 supplies the respective units with power from a battery pack so as to activate the cell phone ex114 that is digital and is equipped with the camera.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex356.

Furthermore, when an e-mail in data communication mode is transmitted, text data of the e-mail inputted by operating the operation keys ex366 and others of the main body is sent out to the main control unit ex360 via the operation input control unit ex362. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of Embodiments (that is, functioning as the image coding apparatus according to the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the digital audio signals, and the transmitting and receiving unit ex351 performs digital-to-analog conversion and frequency conversion on the data, so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bitstream and an audio data bitstream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of Embodiments (that is, functioning as the image decoding apparatus according to the present invention), and then the display unit ex358 displays, for instance, the video and still images included in the video file linked to the Web page via the LCD control unit ex359.

Furthermore, the audio signal processing unit ex354 decodes the audio signal, and the audio output unit ex357 provides the audio.

Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of Embodiments can be used in any of the devices and systems described. Thus, the advantages described in each of Embodiments can be obtained.

Furthermore, the present invention is not limited to Embodiments, and various modifications and revisions are possible without departing from the scope of the present invention.

Embodiment 7

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be identified, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of Embodiments will be hereinafter described. The multiplexed data is a digital stream in the MPEG2-Transport Stream format.

FIG. 20 illustrates a structure of the multiplexed data. As illustrated in FIG. 20, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of a movie. Here, the primary video is normal video to be displayed on a screen, and the secondary video is video to be displayed on a smaller window in the main video. Furthermore, the interactive graphics stream represents an interactive screen to be generated by arranging the GUI components on a screen. The video stream is coded in the moving picture coding method or by the moving picture coding apparatus shown in each of Embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 21:
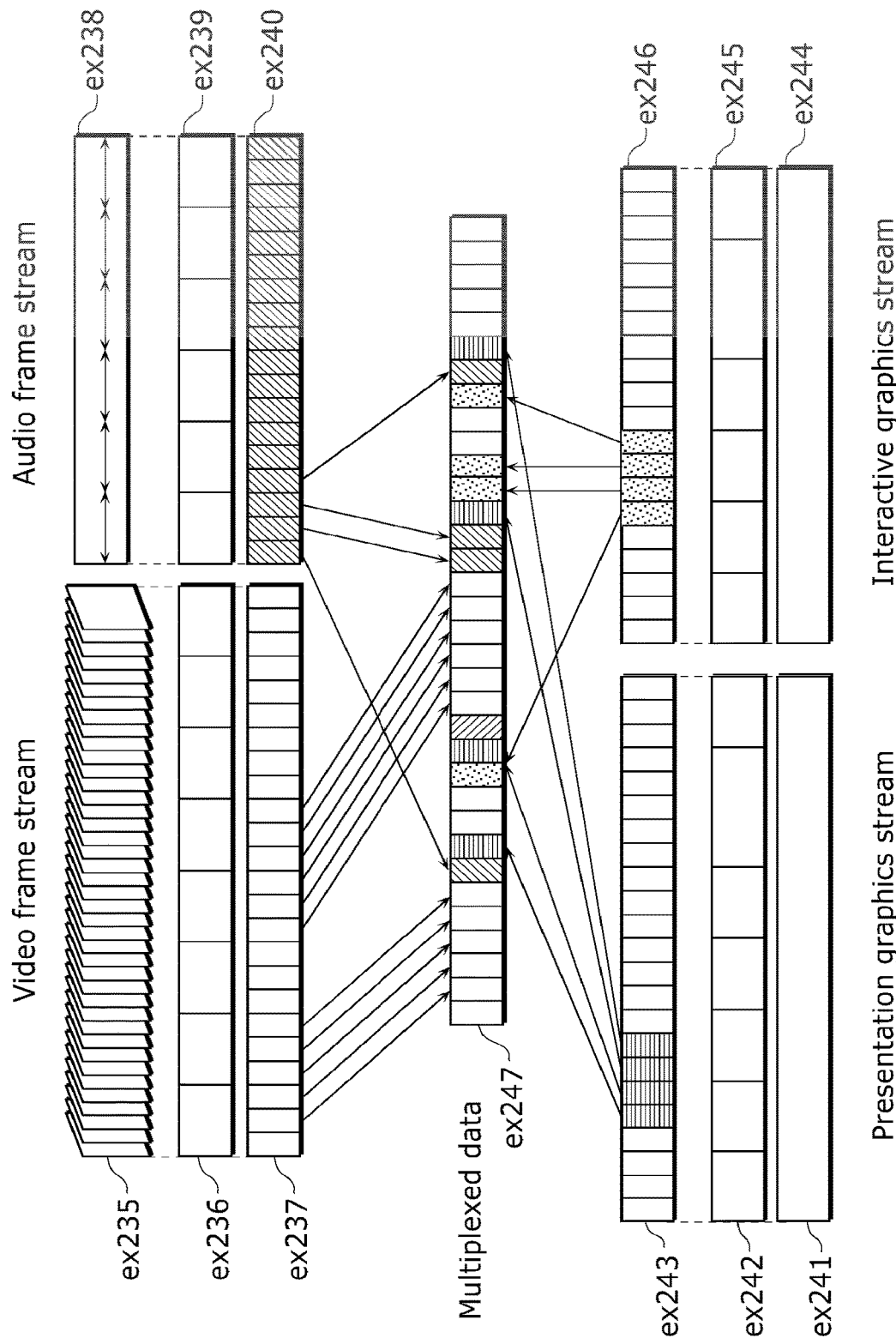
FIG. 21 schematically illustrates how each of the streams is multiplexed in multiplexed data.

FIG. 21 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 22:
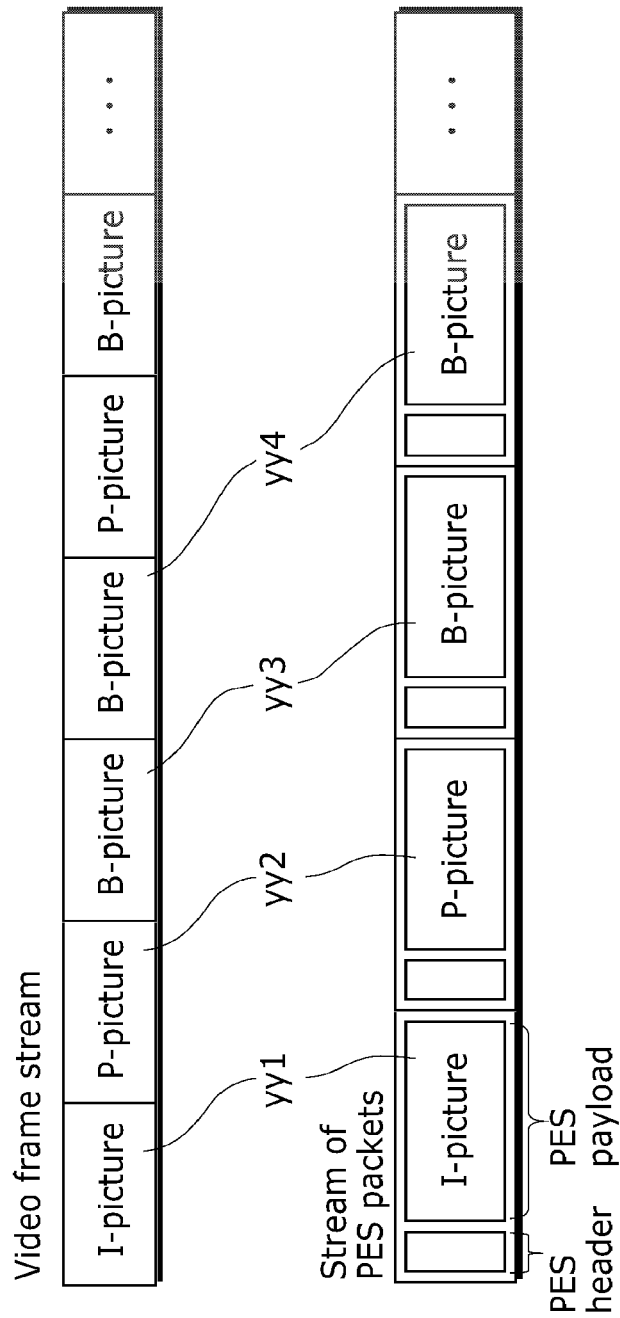
FIG. 22 illustrates how a video stream is stored in a stream of PES packets in more detail.

FIG. 22 illustrates how a video stream is stored in a stream of PES packets in more detail. The first bar in FIG. 22 shows a video frame stream in a video stream. The second bar shows the stream of PES packets. As indicated by arrows denoted as yy2, yy2, yy3, and yy4 in FIG. 22, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 23:
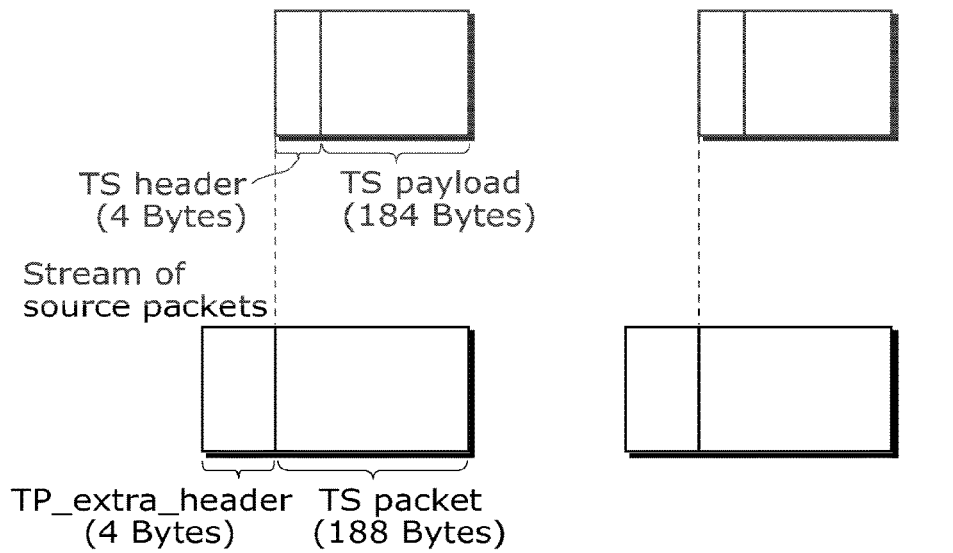
FIG. 23 illustrates a structure of TS packets and source packets in the multiplexed data.

FIG. 23 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 24:
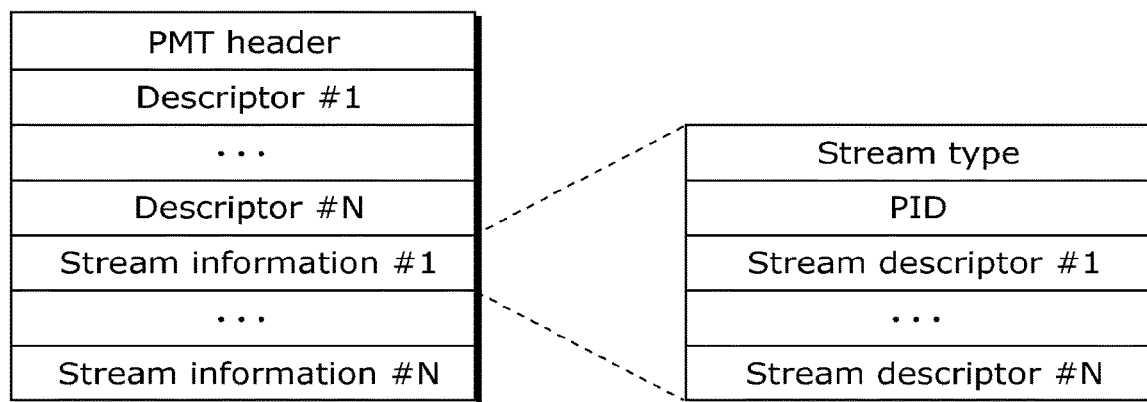
FIG. 24 illustrates a data structure of a PMT.

FIG. 24 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 25:
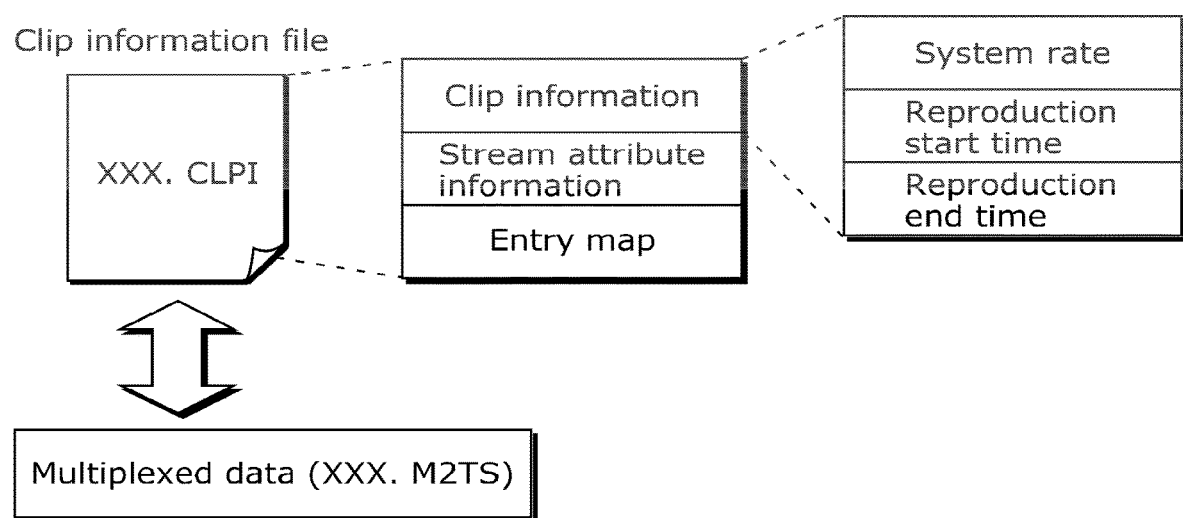
FIG. 25 illustrates an internal structure of multiplexed data information.

Each of the multiplexed data information files is management information of the multiplexed data as shown in FIG. 25. The multiplexed data information files are in one to one correspondence with the multiplexed data, and each of the files includes multiplexed data information, stream attribute information, and an entry map.

As illustrated in FIG. 25, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 26:
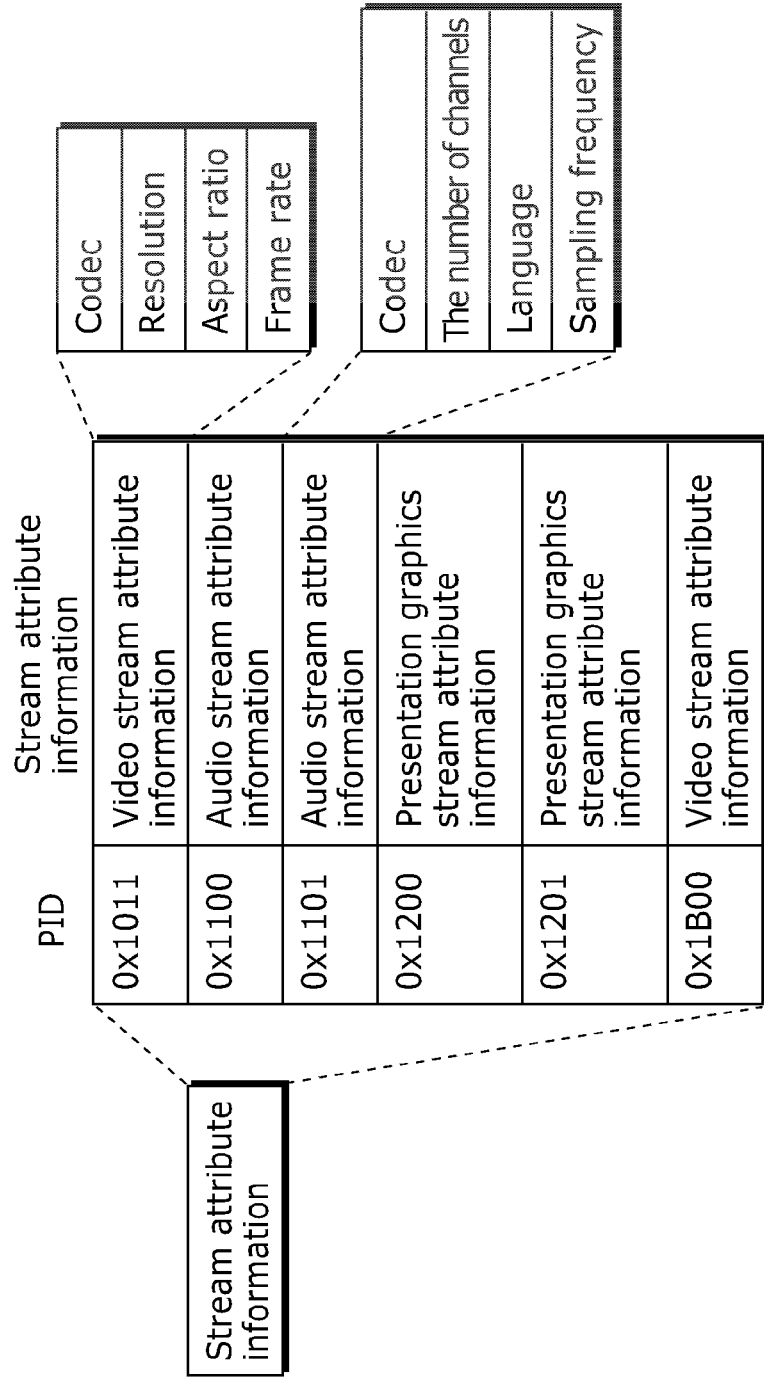
FIG. 26 illustrates an internal structure of stream attribute information.

As shown in FIG. 26, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In Embodiment 7, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of Embodiments includes a step or a unit for allocating unique information indicating video data generated by the moving picture coding method or the moving picture coding apparatus in each of Embodiments, to the stream type included in the PMT or the video stream attribute information. With the configuration, the video data generated by the moving picture coding method or the moving picture coding apparatus described in each of Embodiments can be distinguished from video data that conforms to another standard.

Figure 27:
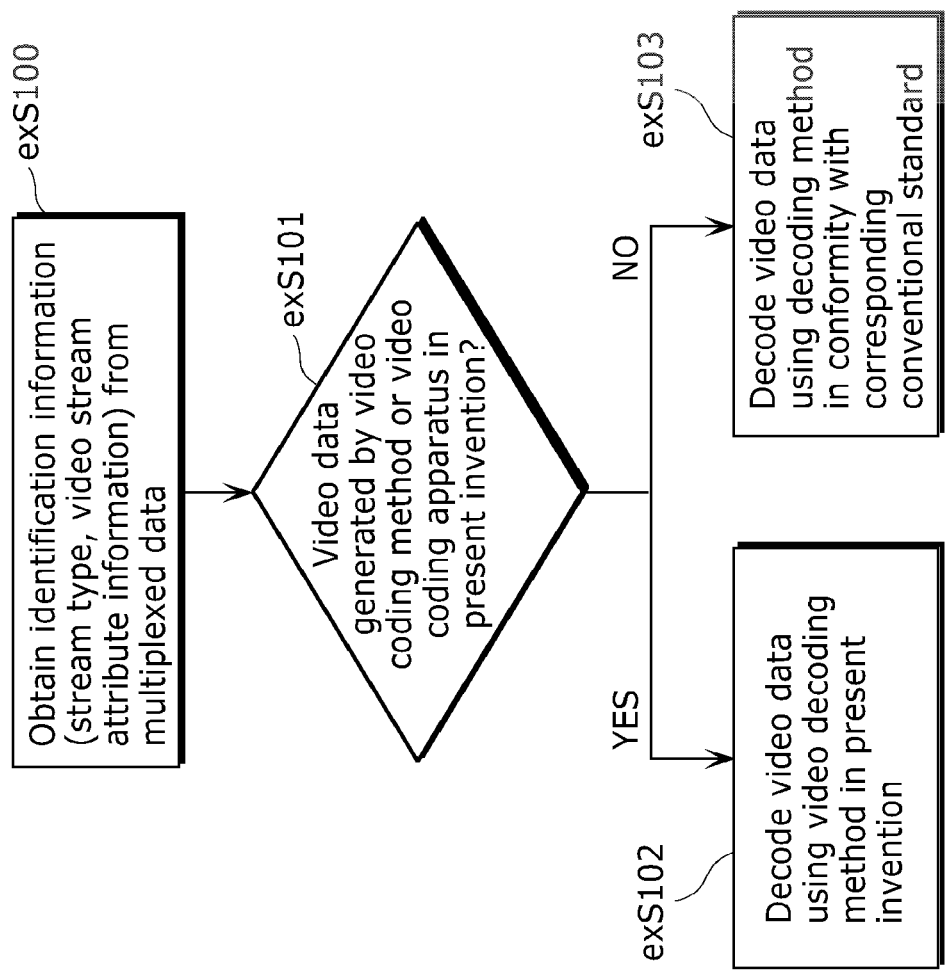
FIG. 27 illustrates steps for identifying video data.

Furthermore, FIG. 27 illustrates steps of the moving picture decoding method according to Embodiment 7. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of Embodiments. When it is determined that the stream type or the video stream attribute information indicates that the multiplexed data is generated by the moving picture coding method or the moving picture coding apparatus in each of Embodiments, in Step exS102, the stream type or the video stream attribute information is decoded by the moving picture decoding method in each of Embodiments. Furthermore, when the stream type or the video stream attribute information indicates conformance to the conventional standards, such as MPEG-2, MPEG-4 AVC, and VC-1, in Step exS103, the stream type or the video stream attribute information is decoded by a moving picture decoding method in conformity with the conventional standards.

As such, allocating a new unique value to the stream type or the video stream attribute information enables determination whether or not the moving picture decoding method or the moving picture decoding apparatus that is described in each of Embodiments can perform decoding. Even upon an input of multiplexed data that conforms to a different standard, an appropriate decoding method or apparatus can be selected. Thus, it becomes possible to decode information without any error. Furthermore, the moving picture coding method or apparatus, or the moving picture decoding method or apparatus in Embodiment 7 can be used in the devices and systems described above.

Embodiment 8

Figure 28:
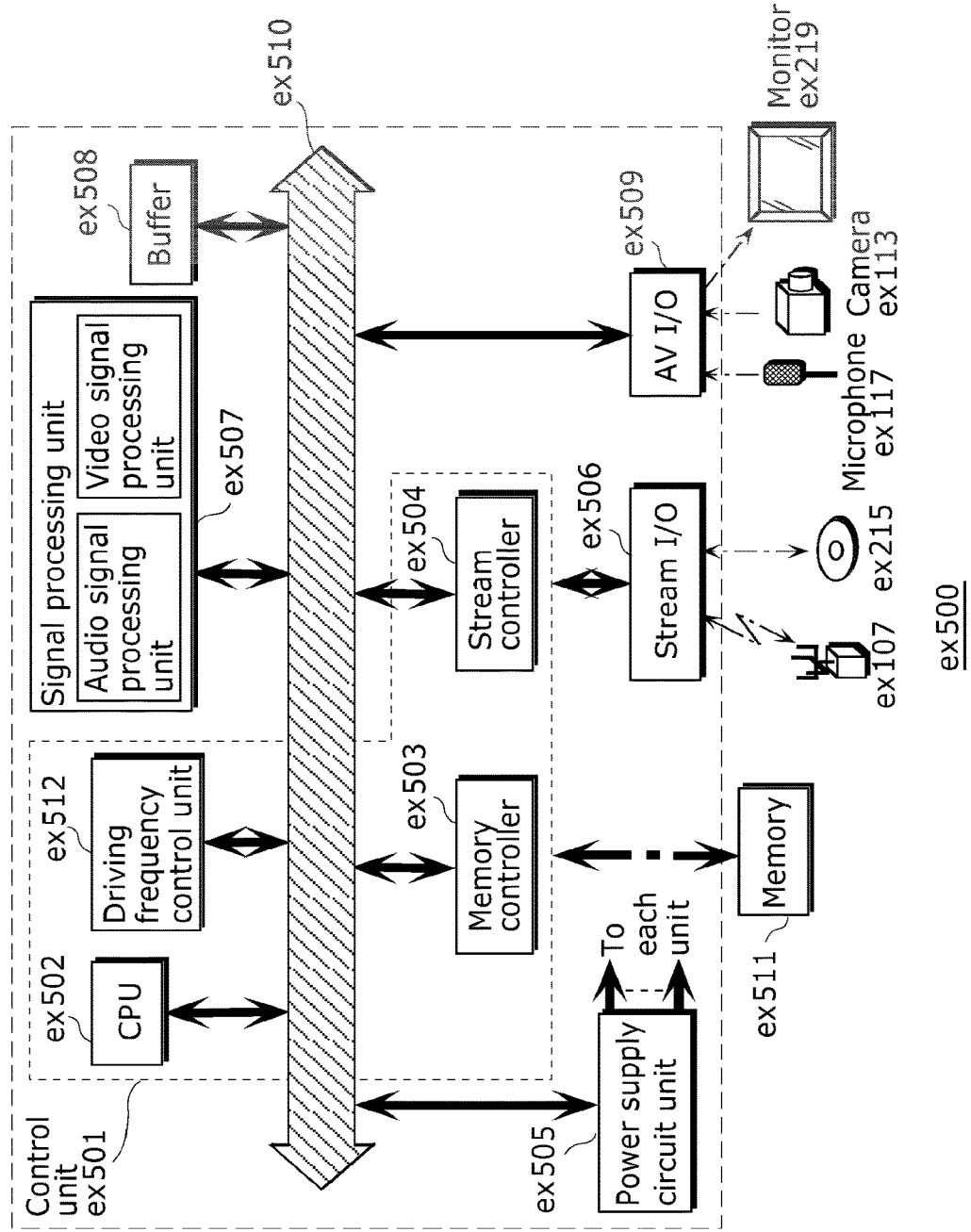
FIG. 28 illustrates a block diagram illustrating an example of a configuration of an integrated circuit for implementing the moving picture coding method and the moving picture decoding method according to each of Embodiments.

Each of the moving picture coding method, the moving picture coding apparatus, the moving picture decoding method, and the moving picture decoding apparatus in each of Embodiments is typically achieved in the form of an integrated circuit or a Large Scale Integrated (LSI) circuit. As an example of the LSI, FIG. 28 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the computing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream JO ex506 provides the multiplexed data outside. The provided multiplexed data is transmitted to the base station ex107, or written on the recording media ex215. When data sets are multiplexed, the data sets should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 9

When video data is decoded in the moving picture coding method or by the moving picture coding apparatus described in each of Embodiments, compared to when video data that conforms to a conventional standard, such as MPEG-2, MPEG-4 AVC, and VC-1, the computing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 29:
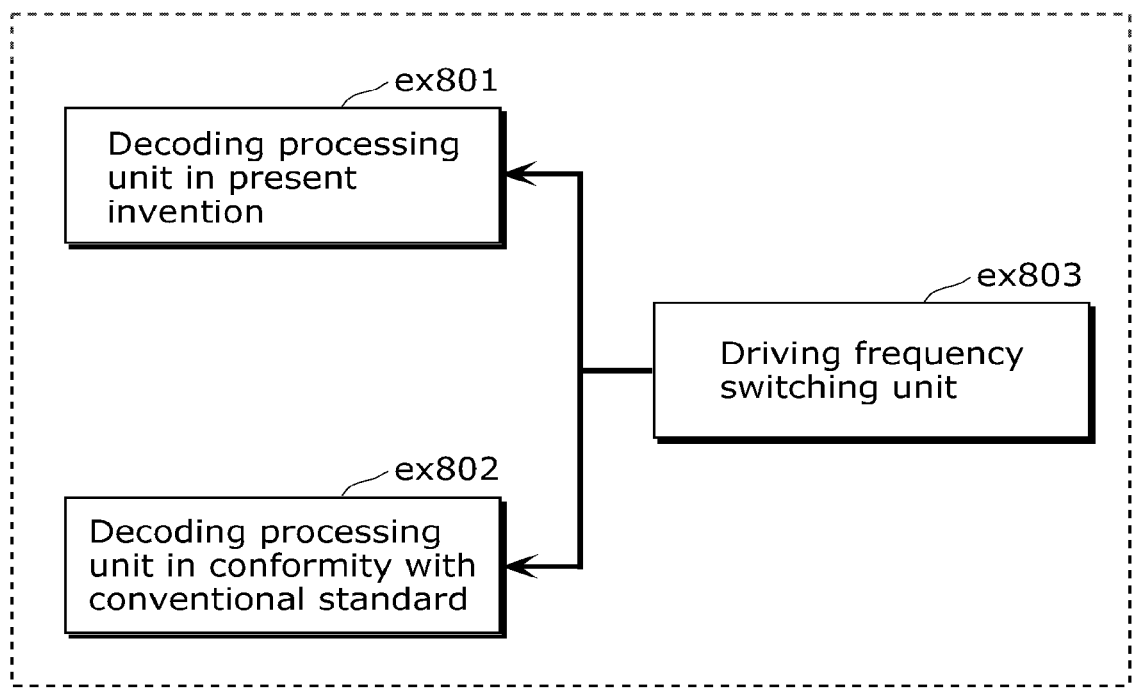
FIG. 29 illustrates a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 29 illustrates a configuration ex800 in Embodiment 9. A driving frequency switching unit ex803 sets a driving frequency to a higher driving frequency when video data is generated by the moving picture coding method or the moving picture coding apparatus described in each of Embodiments. Then, the driving frequency switching unit ex803 instructs a decoding processing unit ex801 that executes the moving picture decoding method described in each of Embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of Embodiments. Then, the driving frequency switching unit ex803 instructs the decoding processing unit ex802 that conforms to the conventional standard to decode the video data.

Figures 31, 32A:
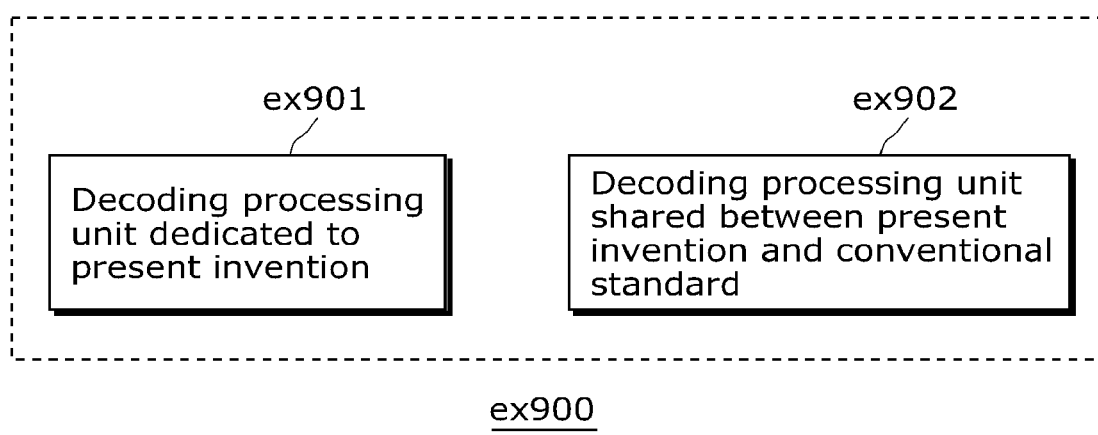
FIG. 31 illustrates an example of a look-up table in which the standards of video data are associated with the driving frequencies.
FIG. 32A illustrates an example of a configuration for sharing a module of a signal processing unit.

More specifically, the driving frequency switching unit ex803 includes the CPU ex502 and the driving frequency control unit ex582 in FIG. 28. Here, each of the decoding processing unit ex802 that executes the video decoding method described in each of Embodiments and the decoding processing unit ex802 that conforms to the conventional standard corresponds to the signal processing unit ex507 in FIG. 28. The CPU ex502 determines to which standard the video data conforms. Then, the driving frequency control unit ex512 determines a driving frequency based on a signal from the CPU ex502. Furthermore, the signal processing unit ex507 decodes the video data based on a signal from the CPU ex502. For example, the identification information described in Embodiment 7 is probably used for identifying the video data. The identification information is not limited to the one described in Embodiment 7 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 31. The driving frequency can be selected by storing the look-up table in the buffer ex508 and an internal memory of an LSI and with reference to the look-up table by the CPU ex502.

Figure 30:
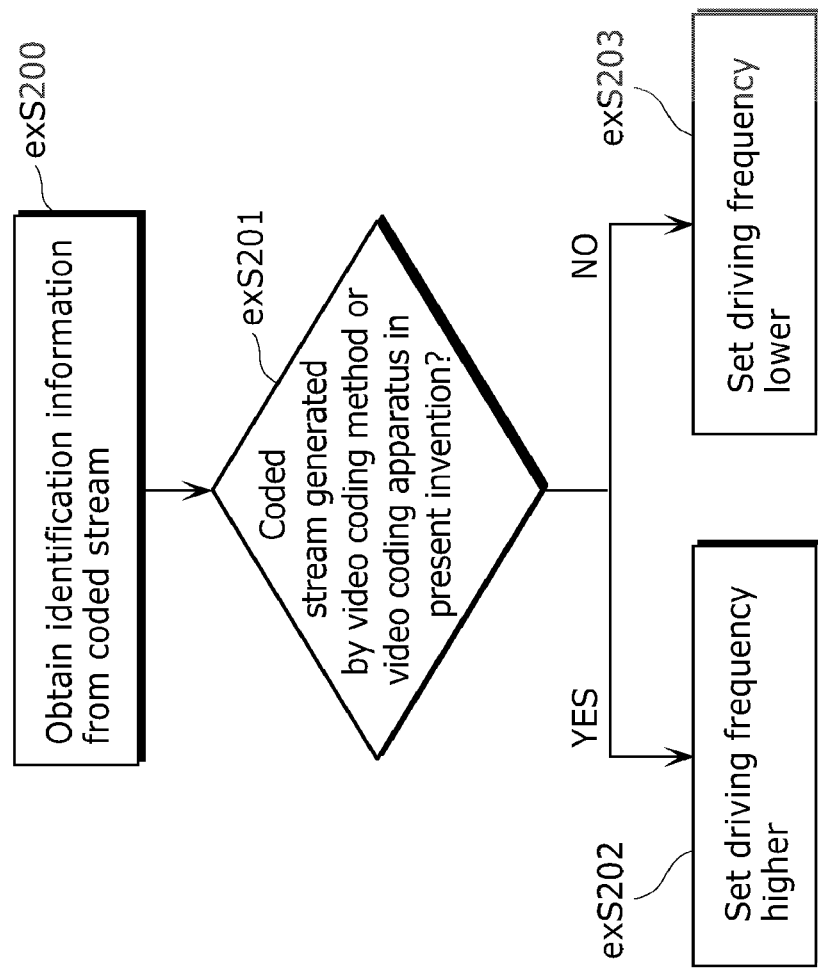
FIG. 30 illustrates steps for identifying video data and switching between driving frequencies.

FIG. 30 illustrates steps for executing a method in Embodiment 9. First, in Step exS200, the signal processing unit ex507 obtains identification information from the multiplexed data. Next, in Step exS201, the CPU ex502 determines whether or not the video data is generated based on the identification information by the coding method and the coding apparatus described in each of Embodiments. When the video data is generated by the coding method and the coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the coding method and the coding apparatus described in each of Embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the computing amount for decoding is larger, the driving frequency may be set higher, and when the computing amount for decoding is smaller, the driving frequency may be set lower as the method for setting the driving frequency. Thus, the setting method is not limited to the ones described above. For example, when the computing amount for decoding video data in conformity with MPEG-4 AVC is larger than the computing amount for decoding video data generated by the moving picture coding method and the moving picture coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of Embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of Embodiments, in the case where the CPU ex502 may have a time delay, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 10

There are cases where a plurality of video data that conforms to a different standard, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of Embodiments and the decoding processing unit that conforms to the conventional standard, such as MPEG-2, MPEG-4 AVC, and VC-1 are partly shared. Ex900 in FIG. 32A shows an example of the configuration. For example, the moving picture decoding method described in each of Embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to the present invention. Since the present invention is characterized by motion compensation in particular, for example, the dedicated decoding processing unit ex901 is used for the motion compensation. Otherwise, the decoding processing unit is probably shared for one of the entropy coding, inverse quantization, deblocking filtering, and inverse quantization, or all of the processing. The decoding processing unit for implementing the moving picture decoding method described in each of Embodiments may be shared for the processing to be shared, and a dedicated decoding processing unit may be used for processing unique to that of MPEG-4 AVC.

Figure 32B:
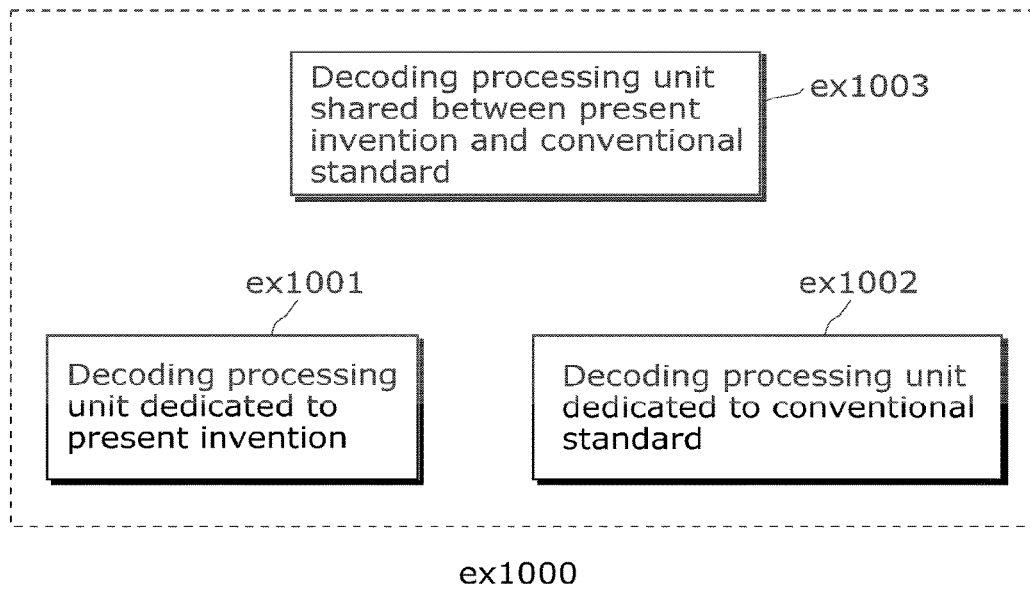
FIG. 32B illustrates another example of a configuration for sharing a module of a signal processing unit.

Furthermore, ex1000 in FIG. 32B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method in the present invention and the conventional moving picture decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of Embodiment 10 can be implemented by the LSI ex500.

As such, reducing the scale of the circuit of an LSI and reducing the cost are possible by sharing the decoding processing unit for the processing to be shared between the moving picture decoding method in the present invention and the moving picture decoding method in conformity with the conventional standard.

INDUSTRIAL APPLICABILITY

The image coding method and the image decoding method according to the present invention are applicable to, for example, televisions, digital video recorders, car navigation systems, cellular phones, digital cameras, and digital video cameras.

What is claimed is:

1. An image coding apparatus of coding a current picture per block with prediction using a current reference picture for a current block, the current reference picture being referred to by a current motion vector, the image coding apparatus comprising:
a processor; and
a non-transitory memory storing thereon a program, which when executed by the processor, causes the processor to:
judging whether or not a first current reference picture for the current block is identical to a first adjacent reference picture for a first adjacent block adjacent to the current block, the first adjacent reference picture being referred to by a first adjacent motion vector;

judging whether or not a second current reference picture is identical to either one of (i) the first adjacent reference picture or (ii) a second adjacent reference picture for a second adjacent block adjacent to the current block, the second adjacent reference picture being referred to by a second adjacent motion vector;

when the second current reference picture is judged to be identical to the first adjacent reference picture, adding the first adjacent motion vector to a candidate list for a second current motion vector;

when the second current reference picture is judged to be identical to the second adjacent reference picture, adding the second adjacent motion vector to the candidate list for the second current motion vector;

selecting a predicted motion vector to be used for coding the second current motion vector from the candidate list for second current motion vector; and coding the second current motion vector using the selected predicted motion vector, wherein when the second current reference picture is judged to not be identical to the first adjacent reference picture, the first adjacent motion vector is not added to the candidate list for the second current motion vector, and wherein when the second current reference picture is judged to not be identical to the second adjacent reference picture, the second adjacent motion vector is not added to the candidate list for the second current motion vector.

2. A non-transitory memory storing thereon a program of coding a current picture per block with prediction using a current reference picture for a current block, the current reference picture being referred to by a current motion vector, the program which when executed by the processor, causes the processor to:

judging whether or not a first current reference picture for the current block is identical to a first adjacent reference picture for a first adjacent block adjacent to the current block, the first adjacent reference picture being referred to by a first adjacent motion vector;

judging whether or not a second current reference picture is identical to either one of (i) the first adjacent reference picture or (ii) a second adjacent reference picture for a second adjacent block adjacent to the current block, the second adjacent reference picture being referred to by a second adjacent motion vector;

when the second current reference picture is judged to be identical to the first adjacent reference picture, adding the first adjacent motion vector to a candidate list for a second current motion vector;

when the second current reference picture is judged to be identical to the second adjacent reference picture, adding the second adjacent motion vector to the candidate list for the second current motion vector;

selecting a predicted motion vector to be used for coding the second current motion vector from the candidate list for second current motion vector; and coding the second current motion vector using the selected predicted motion vector, wherein when the second current reference picture is judged to not be identical to the first adjacent reference picture, the first adjacent motion vector is not added to the candidate list for the second current motion vector, and wherein when the second current reference picture is judged to not be identical to the second adjacent reference picture, the second adjacent motion vector is not added to the candidate list for the second current motion vector.

* * * * *